United States Patent
Bates et al.

(10) Patent No.: US 7,632,089 B2
(45) Date of Patent: Dec. 15, 2009

(54) TAKE OUT AND COOLING SYSTEM AND METHOD

(75) Inventors: Peter A. Bates, Perrysburg, OH (US);
Thomas M. Ingraham, Fort Collins, CO (US); Frank W. Mahr, Toledo, OH (US); Nikhil Mani, Billerica, MA (US); Thomas E. Nahil, Amherst, NH (US); Terry C. Potter, Lambertville, MI (US)

(73) Assignee: Graham Packaging PET Technologies, Inc., York, PA (US)

( * ) Notice: Subject to any disclaimer, the term of this patent is extended or adjusted under 35 U.S.C. 154(b) by 835 days.

(21) Appl. No.: 10/841,771

(22) Filed: May 7, 2004

(65) Prior Publication Data

US 2005/0248054 A1 Nov. 10, 2005

(51) Int. Cl.
*B29C 49/18* (2006.01)
*B29C 49/64* (2006.01)
*B29C 71/00* (2006.01)

(52) U.S. Cl. ...... 425/534; 425/526; 425/532; 425/533; 425/535; 425/813

(58) Field of Classification Search ......... 425/532–535, 425/537–540, 552, 554, 572, 576, 813, 444, 425/451.4, DIG. 38, DIG. 108, DIG. 117, 425/547, 556, 526, 451.1; 264/237, 348
See application file for complete search history.

(56) References Cited

U.S. PATENT DOCUMENTS

| | | | |
|---|---|---|---|
| 1,391,974 A | * | 9/1921 | Phillips ...................... 425/552 |
| 3,659,984 A | * | 5/1972 | Krstolic ...................... 425/72.1 |
| 3,938,847 A | | 2/1976 | Peyton |
| 3,958,685 A | | 5/1976 | McDonald et al. |

(Continued)

FOREIGN PATENT DOCUMENTS

CA 1 127 109 A1 7/1982

(Continued)

OTHER PUBLICATIONS

Translation of JP 08-103948.*

(Continued)

*Primary Examiner*—Philip C Tucker
*Assistant Examiner*—Dimple N Bodawala
(74) *Attorney, Agent, or Firm*—Rissman, Hendricks & Oliverio LLP

(57) ABSTRACT

A take-out and cooling method and apparatus conveys molded plastic articles from a molding machine to and through a cooling station and preferably includes a take-out apparatus that has a main support, a conveyor carried by the main support for movement in an endless path, a cam adjacent to the support, a plurality of arms carried by the conveyor for movement with the conveyor along the endless path and including a follower responsive to the contour of the cam to vary the position of the arms relative to the support, and at least one holder carried by each arm. Each holder is adapted to receive and carry at least one molded article to facilitate in conveying the molded articles and is flexible and resilient to permit relative movement of at least a portion of the holder relative to its associated arm.

31 Claims, 20 Drawing Sheets

U.S. PATENT DOCUMENTS

| | | | |
|---|---|---|---|
| 4,284,370 A | | 8/1981 | Danler et al. |
| 4,330,257 A | * | 5/1982 | Rees et al. .................. 425/556 |
| 4,355,968 A | | 10/1982 | Lagoutte et al. |
| 4,391,578 A | | 7/1983 | Schaar |
| 4,435,146 A | * | 3/1984 | Wiatt et al. ................. 425/534 |
| 4,476,084 A | | 10/1984 | Takada et al. |
| 4,483,436 A | | 11/1984 | Krishnakumar et al. |
| 4,514,166 A | | 4/1985 | Ichizawa et al. |
| 4,586,891 A | * | 5/1986 | Ichizawa et al. ............ 425/526 |
| 4,586,892 A | | 5/1986 | Ichizawa et al. |
| 4,588,370 A | | 5/1986 | Ichizawa et al. |
| 4,694,951 A | | 9/1987 | Gibbemeyer |
| 4,709,803 A | | 12/1987 | Swiderski |
| 4,729,732 A | | 3/1988 | Schad et al. |
| 4,767,311 A | | 8/1988 | Gibbemeyer |
| 4,786,455 A | * | 11/1988 | Krishnakumar et al. ..... 264/237 |
| 4,824,359 A | * | 4/1989 | Poehlsen .................... 425/534 |
| 5,206,039 A | | 4/1993 | Valyi |
| 5,582,788 A | * | 12/1996 | Collette et al. ........... 264/297.2 |
| 5,681,597 A | * | 10/1997 | Aguilar et al. .............. 425/537 |
| 5,702,734 A | | 12/1997 | Hartman et al. |
| 5,772,951 A | | 6/1998 | Coxhead et al. |
| 5,807,592 A | | 9/1998 | Alieri |
| 5,975,880 A | * | 11/1999 | Takada et al. ............... 425/526 |
| 6,059,557 A | | 5/2000 | Ing et al. |
| 6,062,845 A | * | 5/2000 | Conaway et al. ............ 425/444 |
| 6,106,273 A | | 8/2000 | O'Dell |
| 6,113,834 A | | 9/2000 | Kozai et al. |
| 6,123,538 A | | 9/2000 | Kutalowski |
| 6,139,789 A | * | 10/2000 | Neter et al. ................. 264/535 |
| 6,143,225 A | | 11/2000 | Domodossola et al. |
| 6,168,416 B1 | | 1/2001 | Galt |
| 6,290,891 B1 | | 9/2001 | Galt |
| 6,299,431 B1 | | 10/2001 | Neter |
| 6,299,804 B1 | | 10/2001 | Domodossola et al. |
| 6,422,379 B1 | * | 7/2002 | Zoppas .................. 198/803.12 |
| 6,475,422 B1 | | 11/2002 | Neter et al. |
| 6,488,878 B1 | | 12/2002 | Neter et al. |
| 7,077,641 B2 | * | 7/2006 | Hirasawatsu et al. ........ 425/534 |
| 7,094,377 B2 | * | 8/2006 | Coran et al. ................. 264/513 |
| 7,264,463 B2 | * | 9/2007 | Domodossola et al. ...... 425/444 |
| 2002/0192038 A1 | | 12/2002 | Trenel et al. |
| 2003/0034231 A1 | | 2/2003 | Palisca |
| 2003/0198707 A1 | | 10/2003 | Battilani |
| 2003/0214077 A1 | | 11/2003 | Unterlander et al. |
| 2004/0009258 A1 | | 1/2004 | Romanski et al. |
| 2004/0185134 A1 | * | 9/2004 | Fiorani et al. ............... 425/537 |
| 2005/0142244 A1 | * | 6/2005 | Unterlander et al. ........ 425/547 |
| 2005/0241721 A1 | | 11/2005 | Ritz et al. |

FOREIGN PATENT DOCUMENTS

| | | |
|---|---|---|
| DE | 197 16 777 A1 | 10/1998 |
| DE | 201 19 118 U1 | 2/2002 |
| DE | 100 65 547 A1 | 7/2002 |
| EP | 228106 A1 * | 7/1987 |
| EP | 0 700 770 A | 3/1996 |
| EP | 0 744 364 A | 11/1996 |
| EP | 0 872 329 A | 10/1998 |
| EP | 0 992 330 A | 4/2000 |
| EP | 1 101 586 A | 5/2001 |
| EP | 1 101 587 A | 5/2001 |
| JP | 61 125833 A | 6/1986 |
| JP | 62 170312 A | 7/1987 |
| JP | 62 273816 A | 11/1987 |
| JP | 03 010827 A | 1/1991 |
| JP | 03 045310 A | 2/1991 |
| JP | 07 171888 A | 7/1995 |
| JP | 407171888 A | 7/1995 |
| JP | 08 103948 A | 4/1996 |
| JP | 08-103948 * | 8/1996 |
| JP | 09 057824 A | 3/1997 |
| JP | 09 266613 A | 10/1997 |
| JP | 11 129288 A | 5/1999 |
| JP | 2000/025729 A | 1/2000 |
| JP | 2000/108127 A | 4/2000 |
| JP | 2001 105480 A | 4/2001 |
| JP | 2002 361720 A | 12/2002 |
| JP | 2005/028806 A | 2/2005 |
| WO | WO 85/00551 A | 2/1985 |
| WO | WO 99/50039 A | 10/1999 |
| WO | WO 01/44084 A | 6/2001 |
| WO | WO 03/045823 A | 6/2003 |
| WO | WO 03/047834 A | 6/2003 |
| WO | WO 2005/099986 A | 10/2005 |

OTHER PUBLICATIONS

International Search Report mailed Dec. 21, 2005 from corresponding application PCT/US2005/015805.

Langecker, G.R., "Automatisierungen Im Spritzgiessbetrieb," Kunststoffe, Carl Hanser Verlag, Munchen, DE, vol. 73, No. 10, Oct. 1983, pp. 559-563.

* cited by examiner

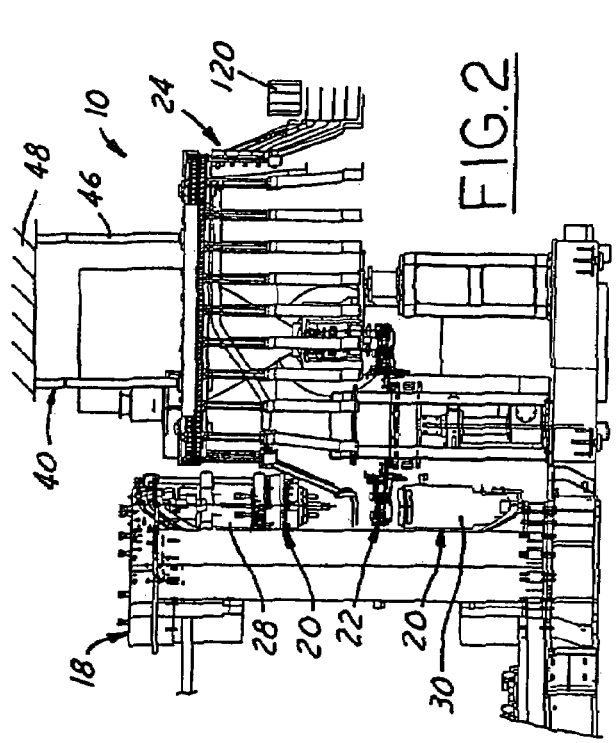
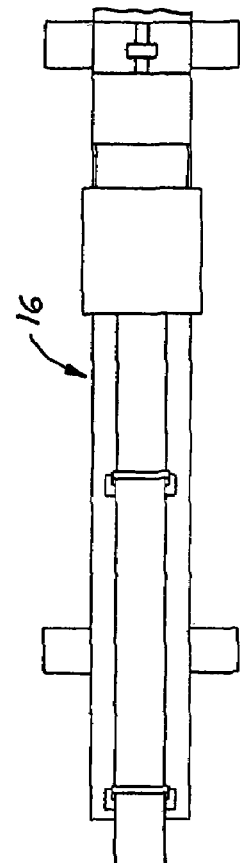
FIG.2
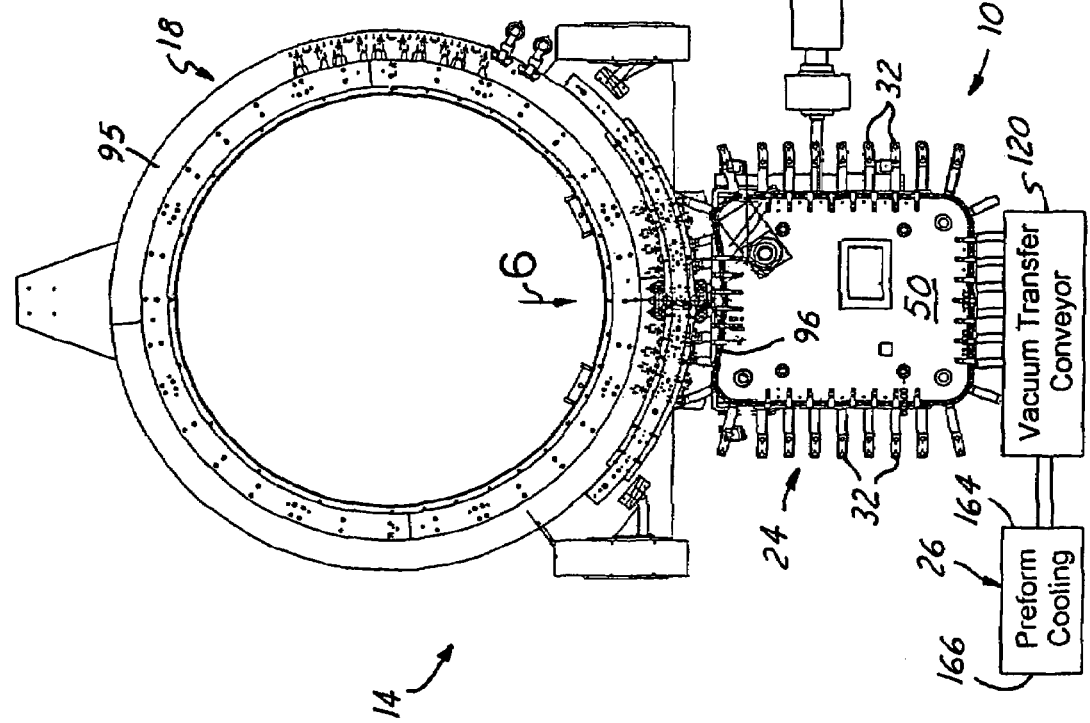
FIG.3

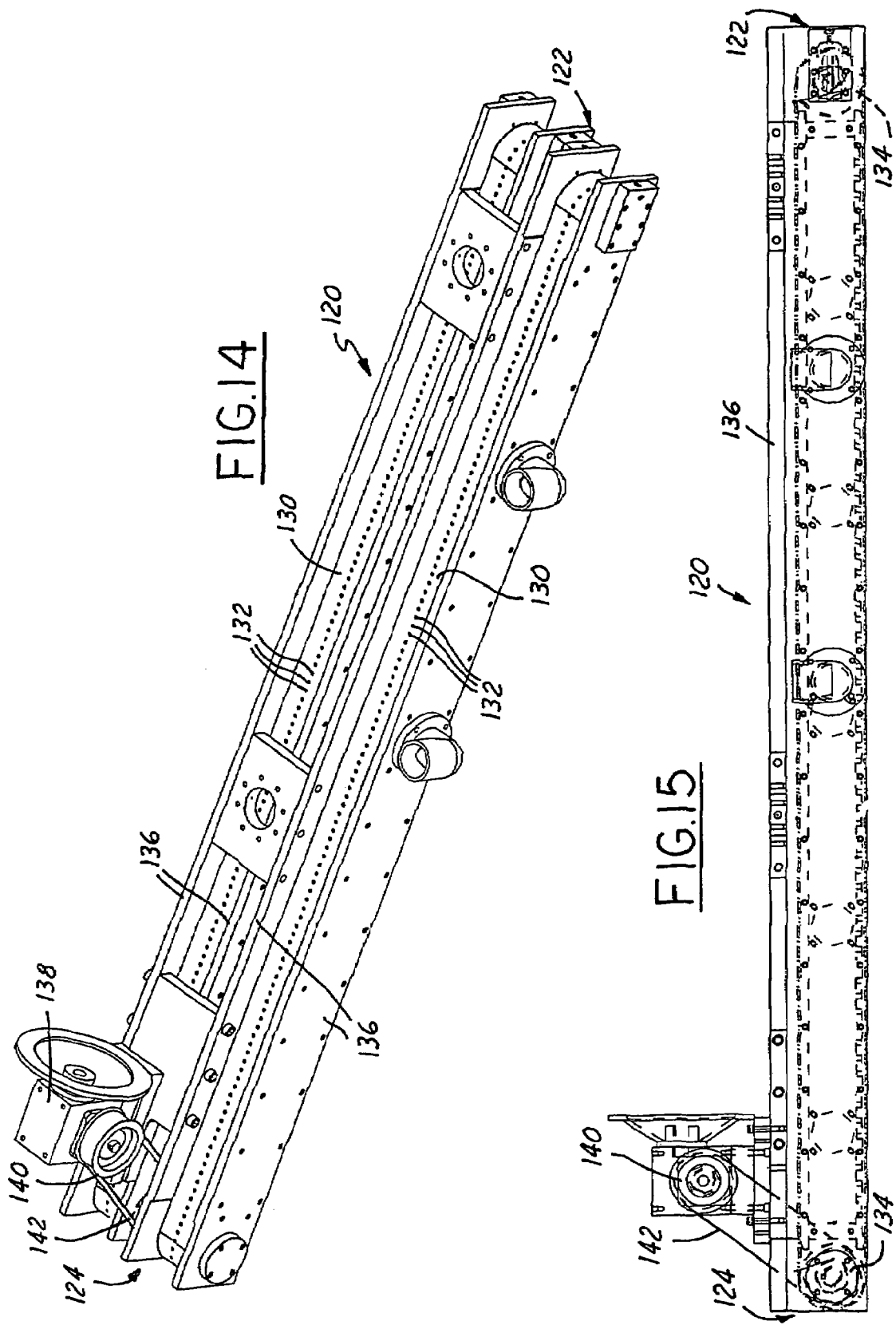

TAKE OUT AND COOLING SYSTEM AND METHOD

FIELD OF THE INVENTION

This invention relates generally to molding plastic articles, and more particularly to an apparatus and a method for conveying molded articles from a molding machine to and through a cooling station.

BACKGROUND OF THE INVENTION

Plastic articles, such as preforms for plastic containers, can be formed by various methods including injection molding and compression molding. The molded preforms are subsequently processed, such as by blow molding, into their desired final shape. After the initial molding step, the preforms are preferably promptly removed from the mold tooling in a still somewhat soft and pliable condition, to increase the efficiency and production rate of preforms for each mold. It may be desirably to initially cool the preforms prior to their being formed in a blow molding apparatus to facilitate handling the preforms, and to control the cooling of the preforms and thereby control the physical properties of the preforms prior to being blow molded. Accordingly, challenges are presented in removing the at least somewhat soft preforms from the molding machine and transferring them to a cooling machine at a desired rate and without damaging the preforms. Challenges are also presented in efficiently and effectively cooling the preforms at a desired rate and without damaging the preforms as they are moved through the cooling station.

SUMMARY OF THE INVENTION

A take-out and cooling method and apparatus, in accordance with an exemplary but presently preferred first aspect of the invention, conveys molded plastic articles from a molding machine to and through a cooling station. The apparatus preferably includes a take-out apparatus that has a main support, a conveyor carried by the main support for movement in an endless path, a cam adjacent to the support, a plurality of arms carried by the conveyor for movement with the conveyor along the endless path and including a follower responsive to the contour of the cam to vary the position of the arms relative to the support, and at least one holder carried by each arm. Each holder is adapted to receive and carry at least one molded article to facilitate in conveying the molded articles and is flexible and resilient to permit relative movement of at least a portion of the holder relative to its associated arm.

In accordance with another exemplary but presently preferred aspect of the invention, a molded article cooling system includes a transfer mechanism that receives a plurality of molded articles and conveys them along a path from an infeed section to an outfeed section, and a cooling mechanism extending along the path and having an elongate fluid outlet through which fluid is directed toward the plurality of molded articles. The fluid outlet is substantially continuous along at least a portion of the path so that a substantially continuous stream of fluid is directed toward said plastic articles. The fluid outlet is preferably defined by at least two plates that are adjustable to permit the width and/or direction of the fluid stream discharged from the fluid outlet to be adjusted as desired. Desirably, the fluid outlet provides a generally continuous line or knife of coolant flow rather than intermittent streams of fluid flow such as from a plurality of spaced nozzles.

Accordingly to yet another presently preferred embodiment, a system for removing molded articles from a molding machine and cooling the molded articles includes a take-out mechanism that receives molded articles from the molding machine and conveys them away from the molding machine, an intermediate conveyor that conveys molded articles away from the take-out apparatus to a cooling station, and a cooling conveyor that conveys the molded articles from the intermediate conveyor through the cooling station. The cooling conveyor preferably includes at least one pair of spaced apart belts adapted to frictionally engage and carry the molded plastic articles from an infeed section of the cooling conveyor to an outfeed section of the cooling conveyor. Preferably, the cooling conveyor advances molded articles at a slower rate than does the intermediate conveyor to reduce the spacing between adjacent molded articles. Also preferably, the intermediate conveyor preferably includes a permeable belt to communicate with a vacuum source and adapted to engage an upper end of molded articles to suspend the molded articles from the permeable belt under the vacuum force.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 2 is a side view of the compression molding production line illustrating the general location of the take-out apparatus relative to a compression molding machine and an intermediate conveyor;

FIG. 3 is a diagrammatic plan view of the compression molding production line including a take-out and cooling system with the take-out apparatus, intermediate conveyor and a cooling station;

FIG. 14 is a perspective view of the intermediate conveyor;

FIG. 15 is a side view of the intermediate conveyor;

DETAILED DESCRIPTION OF THE PREFERRED EMBODIMENTS

Figure 1:
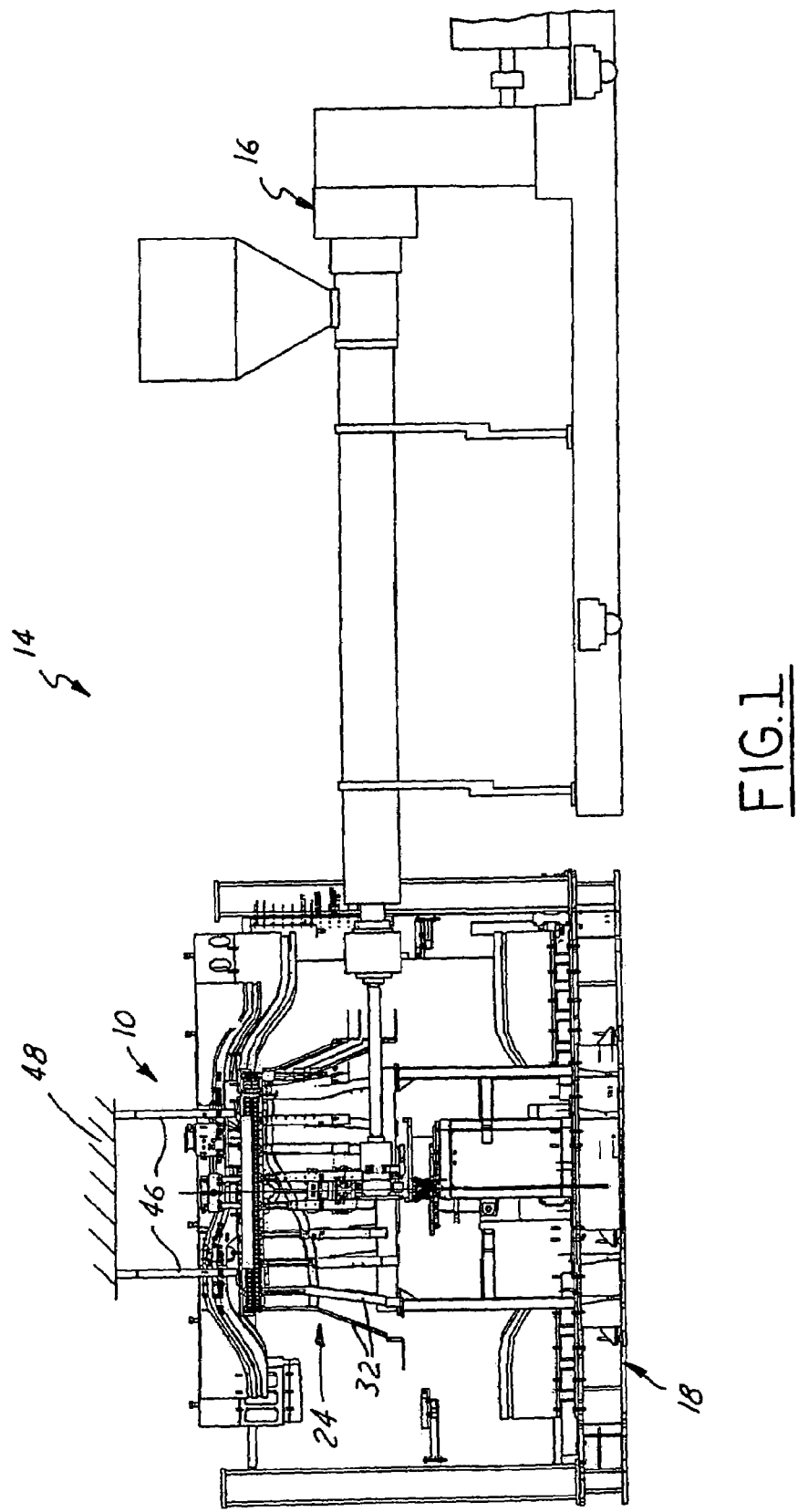
FIG. 1 is a side view illustrating a portion of a compression molding production line including one presently preferred embodiment of a takeout apparatus.

Referring in more detail to the drawings, FIGS. 1-3 illustrate a system 10 for conveying and cooling molded plastic articles 12. In one presently preferred embodiment, the system 10 is used to transfer molded articles 12 in a compression molding production line 14. The compression molding production line 14 includes, generally, an extruder 16 that provides molten plastic material from which the plastic articles 12 are molded, a compression molding machine 18 including a plurality of mold tooling pairs 20 each having at least one mold cavity in which a plastic article 12 is formed, and a pellet distributor 22 that transfers gobs or charges of plastic from the extruder 16 to the mold tooling 20. The compression molding machine and mold tooling may be as shown and described in U.S. patent application Ser. Nos. 10/816,498, and 10/822,299, and the pellet distributor as shown in U.S. patent application Ser. No. 10/822,297, the disclosures of which are incorporated herein by reference in their entirety. The conveying and cooling system 10 preferably includes a takeout apparatus 24 that conveys molded articles 12 away from the molding machine 18, and a cooling station 26 that receives molded articles 12 downstream of the takeout apparatus 24 and at least partially cools the molded articles 12 as they pass therethrough.

In one presently preferred embodiment, the molding machine 18 forms plastic preforms 12 that are subsequently blow molded into a desired final shape, such as to form plastic containers. The molding machine 18 may include a plurality of pairs of mold tooling 20 including an upper mold tooling half 28 and a lower mold tooling half 30 (FIG. 2) each carried by a rotatable turret 95. At least one of the mold tooling halves 28, 30 is moveable relative to the other from an open position where the mold tooling halves are spaced apart to a closed position where the mold tooling halves 28, 30 are brought together to compression mold a plastic article 12. During the portion of the cycle wherein the mold tooling halves 28, 30 are open or spaced apart, the takeout apparatus 24 receives already formed molded articles 12 from the mold tooling 20, and the pellet distributor 22 distributes fresh gobs of plastic into the mold cavities of the mold tooling 20 for the next forming cycle. To increase the efficiency of the production line 14, the takeout apparatus 24 may be disposed in the same general area relative to the molding machine 18 as the pellet distributor 22. To accomplish this, arms 32 of the takeout apparatus 24 may be disposed over the pellet distributor 22 so that in the same general window or space wherein formed articles 12 are removed by the takeout apparatus 24, fresh plastic gobs can be distributed into the mold tooling 20 for a subsequent cycle. This reduces the time that the mold tooling halves 28, 30 need to be opened or separated from each other, and thereby increases the time for the compression molding portion of the molding cycle. Of course, to do this, the takeout apparatus 24 and pellet distributor 22 are designed to avoid interference with each other and to coexist in a relatively limited window or space. Accordingly, the following detailed description of the takeout apparatus 24, cooling station 26, and associated conveyors, is set forth with regard to the presently preferred system for manufacturing molded articles 12 and cooling them, and is not intended to limit the broader aspects of the disclosure and inventive concepts, as set forth herein and in the appended claims.

Figure 16:
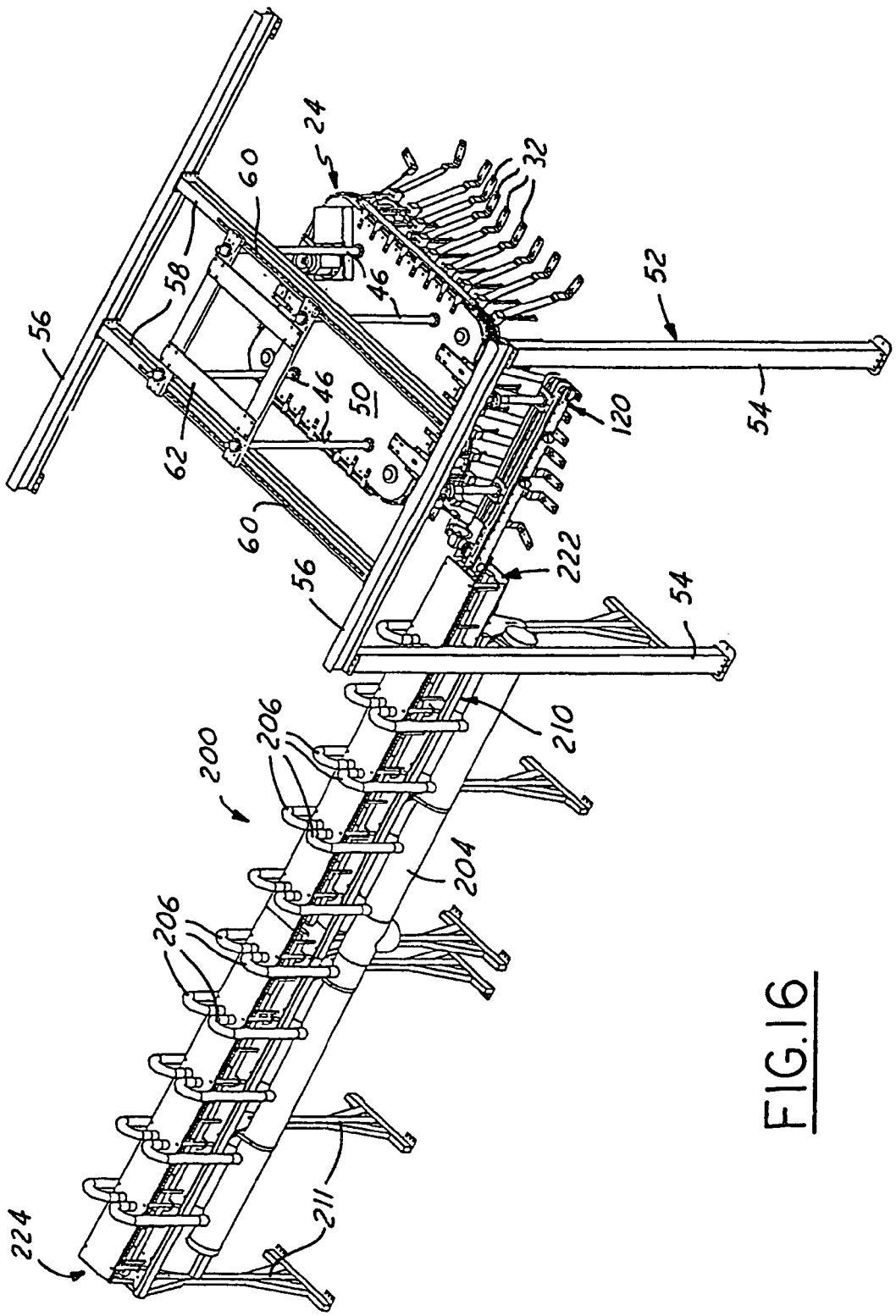
FIG. 16 is a perspective view of a take-out and cooling apparatus for conveying and cooling molded plastic articles according to a second presently preferred embodiment.
Figure 17:
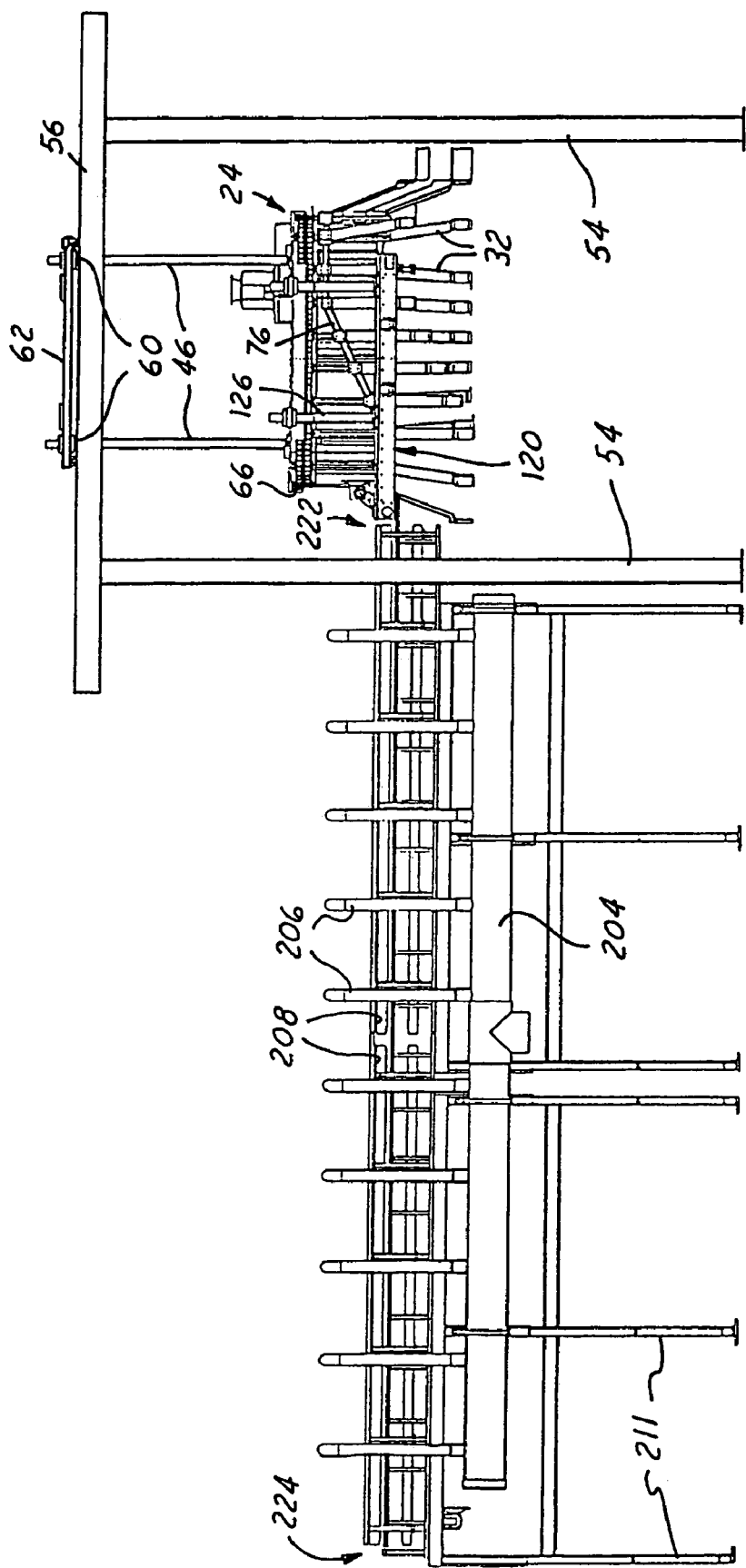
FIG. 17 is a side view of the take-out and cooling system of FIG. 16.
Figure 18:
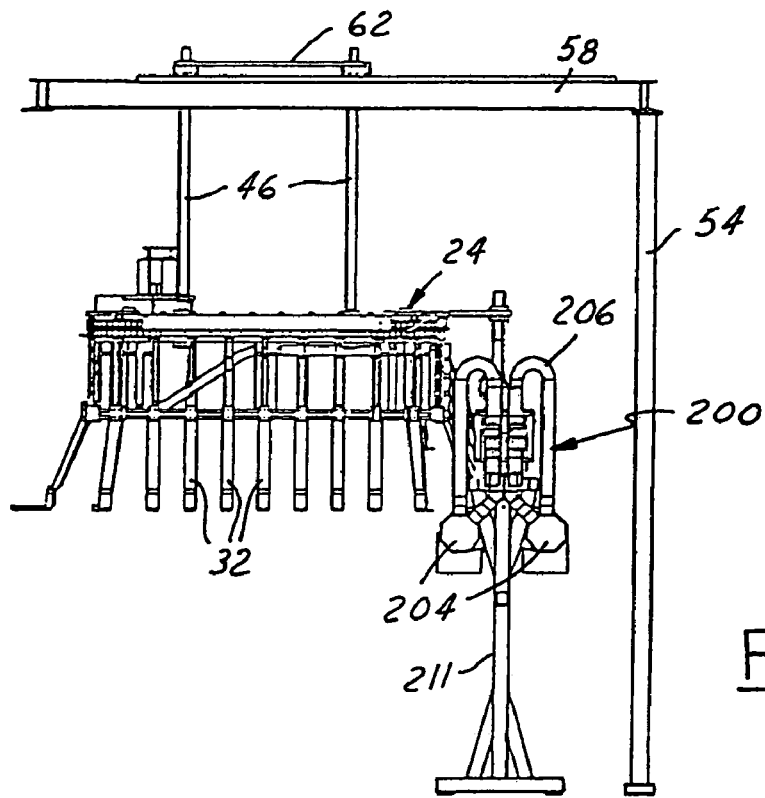
FIG. 18 is an end view of the system shown in FIGS. 16 and 17.
Figure 19:
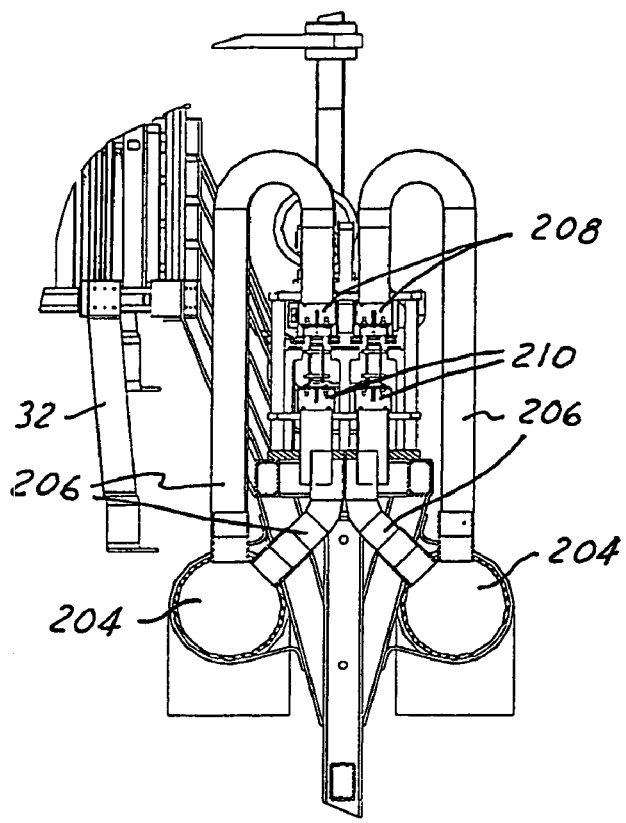
FIG. 19 is an enlarged end view illustrating a portion of the cooling station shown in FIG. 18.
Figure 20:
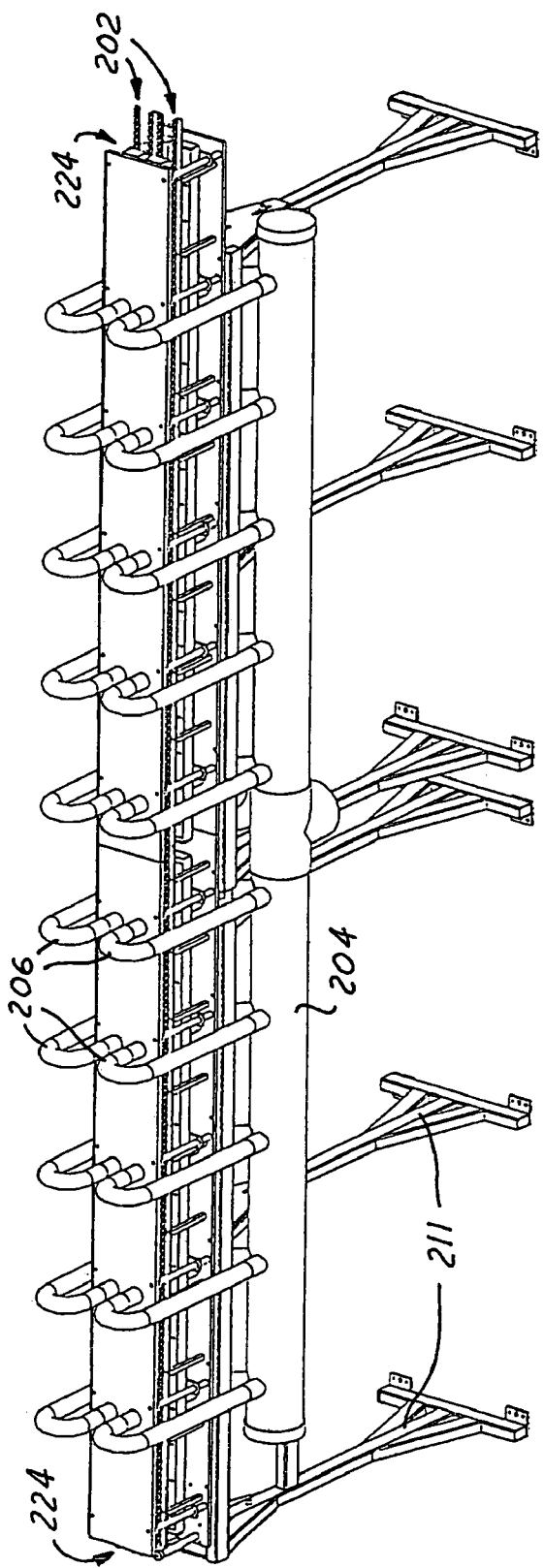
FIG. 20 is a perspective view of a second presently preferred embodiment of a cooling station of the system shown in FIG. 16.
Figure 21:
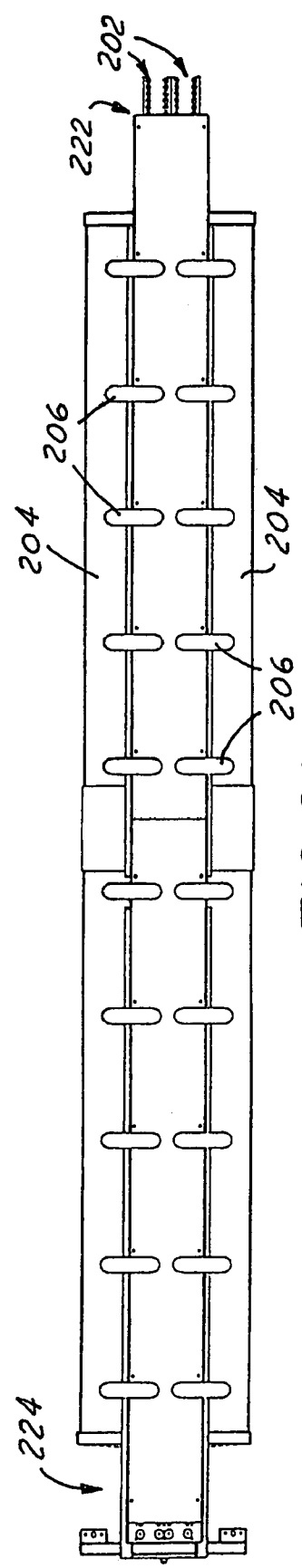
FIG. 21 is a plan view of the cooling station.
Figure 22:
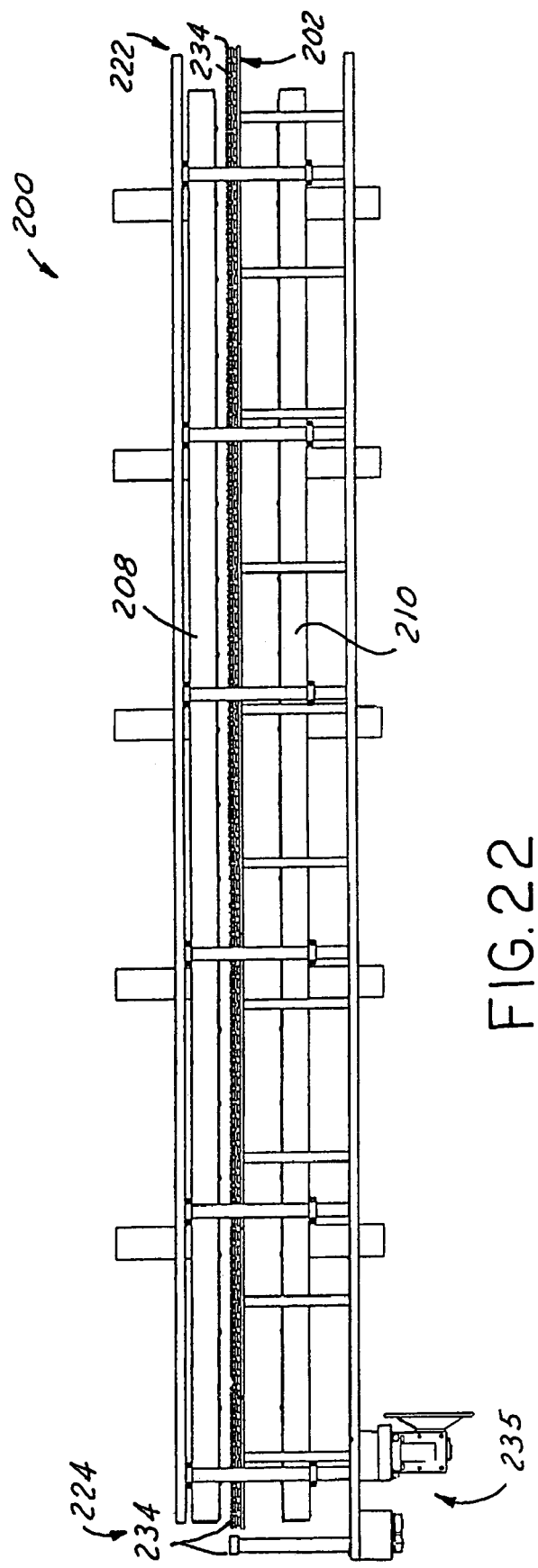
FIG. 22 is a side view of the cooling station.
Figure 23:
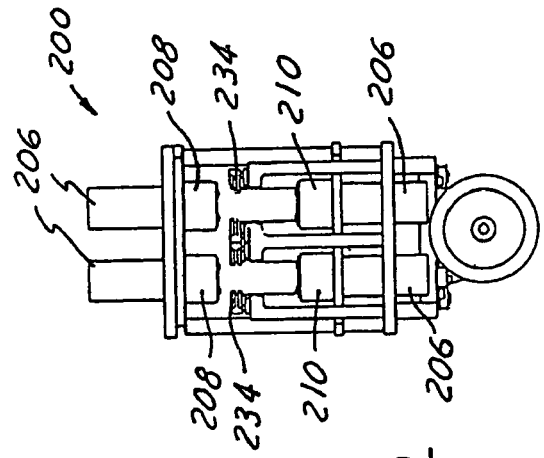
FIG. 23 is an end view of the cooling station.
Figure 24:
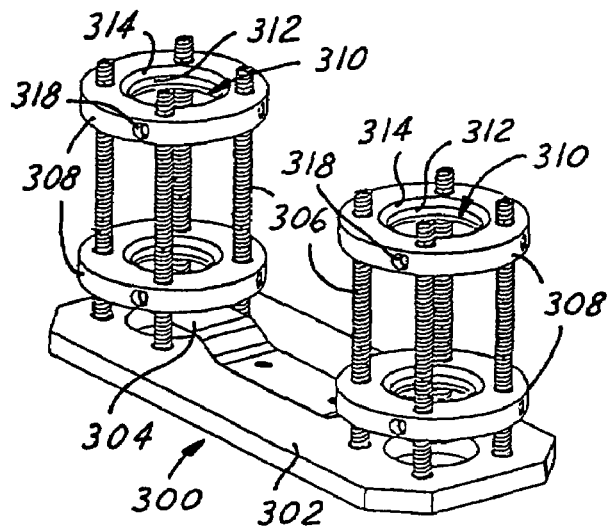
FIG. 24 is a perspective view of an alternate embodiment holder for an arm of the take-out apparatus including a pair of holders.
Figure 25:
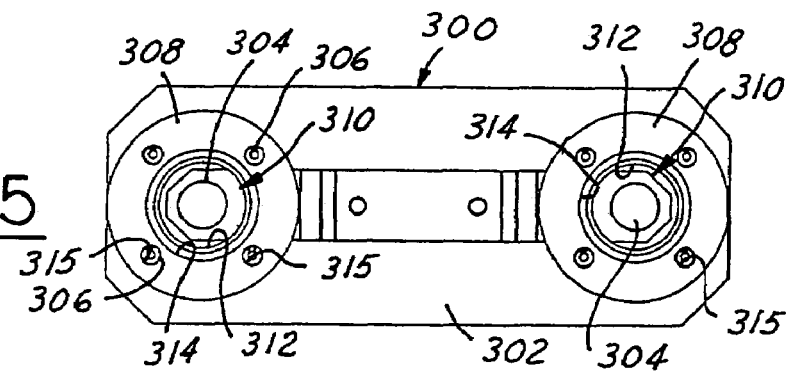
FIG. 25 is a plan view of the holder.
Figure 26:
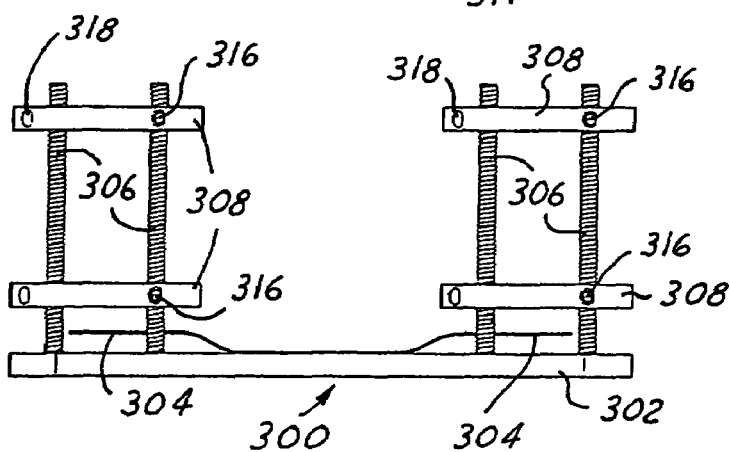
FIG. 26 is a side view of the holder.
Figure 27:
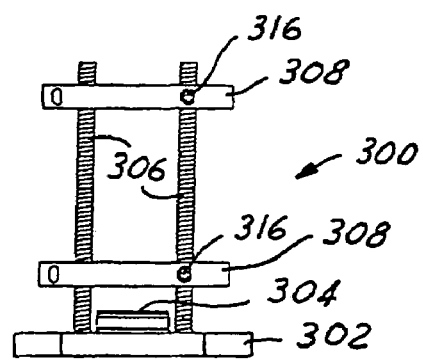
FIG. 27 is an end view of the holder.

In more detail, as shown in FIGS. 1-6, the takeout apparatus 24 includes a frame 40, a drive assembly 42, and a plurality of arms 32 coupled to the drive assembly 42 for movement about the frame 40 in an endless path. Each arm 32 preferably includes at least one holder 100 constructed and arranged to receive and convey a molded plastic article 12 as desired. The frame 40 preferably includes one or more support rods 46 fixed at one end to a base or main support 48, and at their other end to a support plate 50. In one presently preferred embodiment, the support plate 50 is generally rectangular with rounded corners providing a generally smooth and continuous periphery about which the arms 32 may be continuously circulated. As best shown in FIGS. 16-18, the apparatus 24 may include a main frame 52 having upstanding posts 54 spanned by appropriate beams, with spaced beams 56 interconnected by cross beams 58. The cross beams 58 may provide rails 60 on which a support frame 62 is carried with the rods 46 of the takeout apparatus 24 coupled to the support frame 62 and moveable with the support frame 62 along the rails 60 to adjust the location of the takeout apparatus 24 as desired.

The drive assembly 42 (FIG. 4) preferably includes a motor 64 and a circumferentially continuous transmission member 66 driven by the motor 64 in an endless path or loop. In one presently preferred embodiment, the motor 64 is servo-controlled and preferably communicated with a controller 65 enabling adjustment and control of the rate at which the transmission member 66 is driven. The motor 64 is preferably operated so that the arms 32 are driven as a function of the rotational speed of the turret 95. In the presently preferred embodiment, the motor 64 is coupled to a drive sprocket 68 mounted on the support plate 50 by a drive shaft 70 driven for rotation by the motor 64. A plurality of driven sprockets 72 are also mounted on the support plate 50 by appropriate shafts 74 about which the driven sprockets 72 rotate, with each driven sprocket 72 and the drive sprocket 68 preferably disposed adjacent a rounded corner of the support plate 50. In this embodiment, the transmission member 66 includes at least one, and preferably two parallel and substantially inextensible chains 66 having interconnected links and being carried and driven by the sprockets 68, 72. The chains 66 are formed in an endless loop about the periphery of the support plate 50 and preferably carry a plurality of arms 32 that are driven in an endless loop around the support plate 50. A cam track 76, that is also carried by the support plate 50, further controls and directs the movement of the arms 32 as they are circulated about the periphery of the support plate 50.

Figure 4:
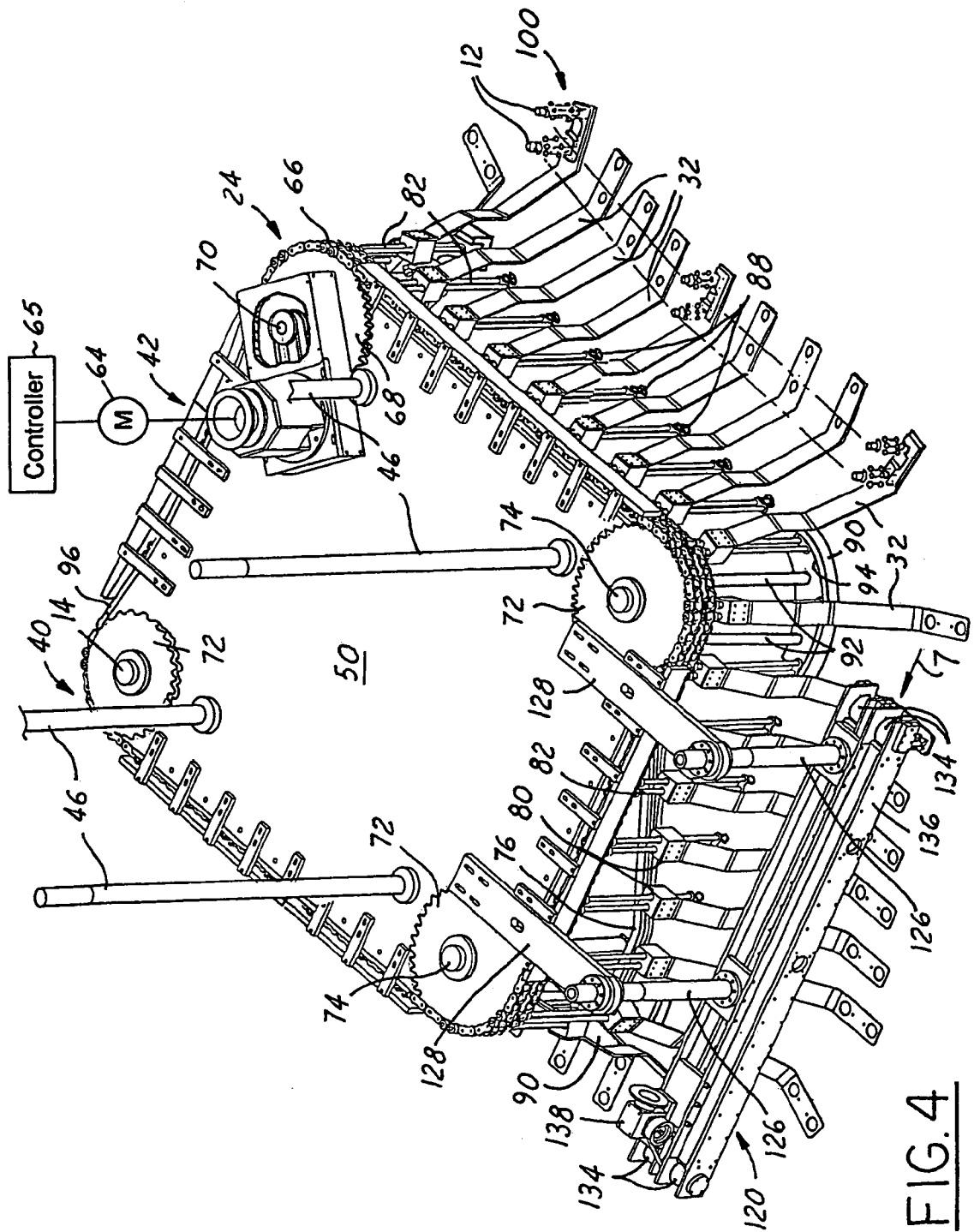
FIG. 4 is a perspective view of the take-out apparatus and intermediate conveyor with the holders on most of the arms removed.
Figure 5:
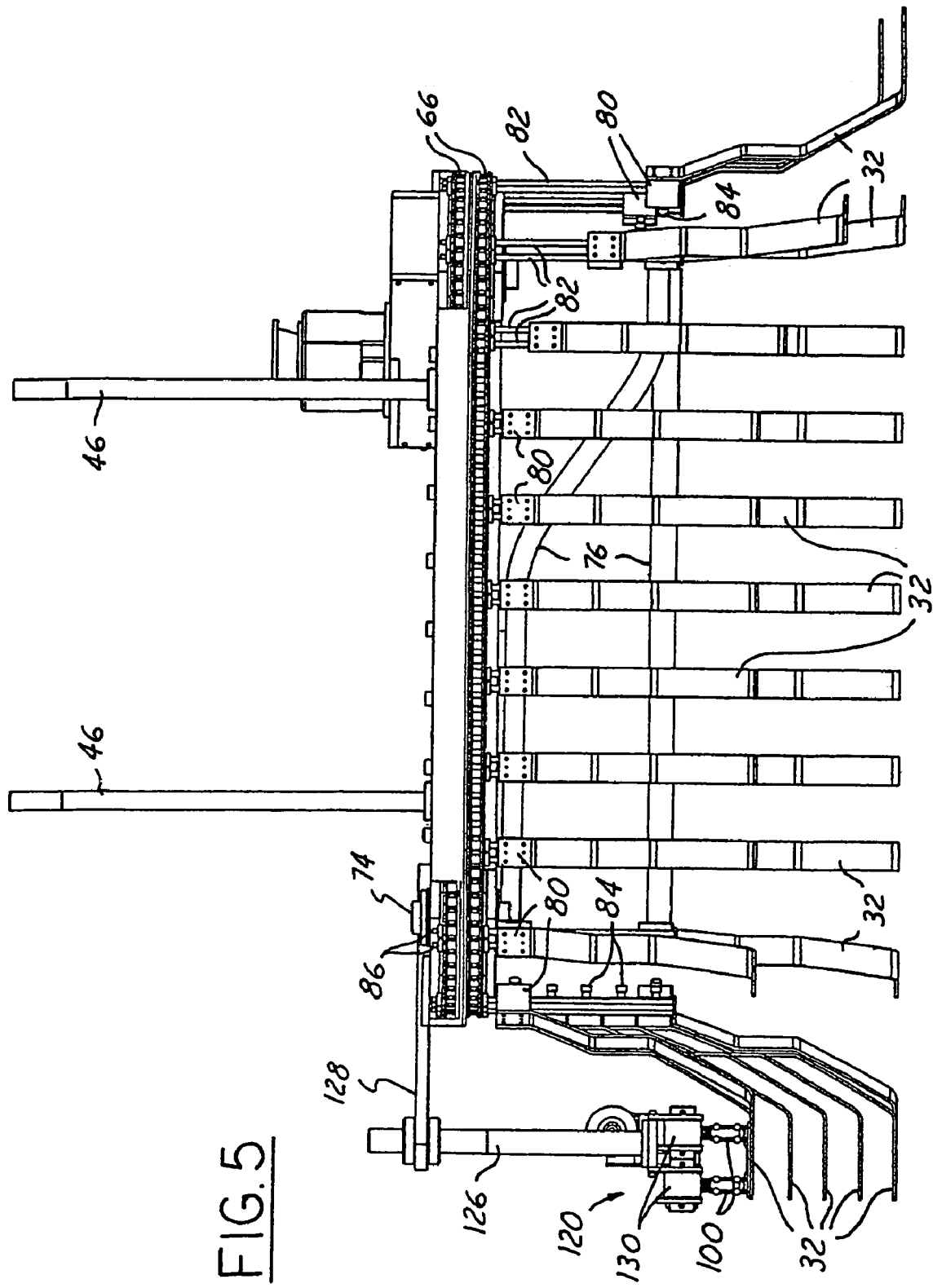
FIG. 5 is an elevational view of the take-out apparatus and intermediate conveyor with the holders removed from the arms of the takeout apparatus.
Figure 6:
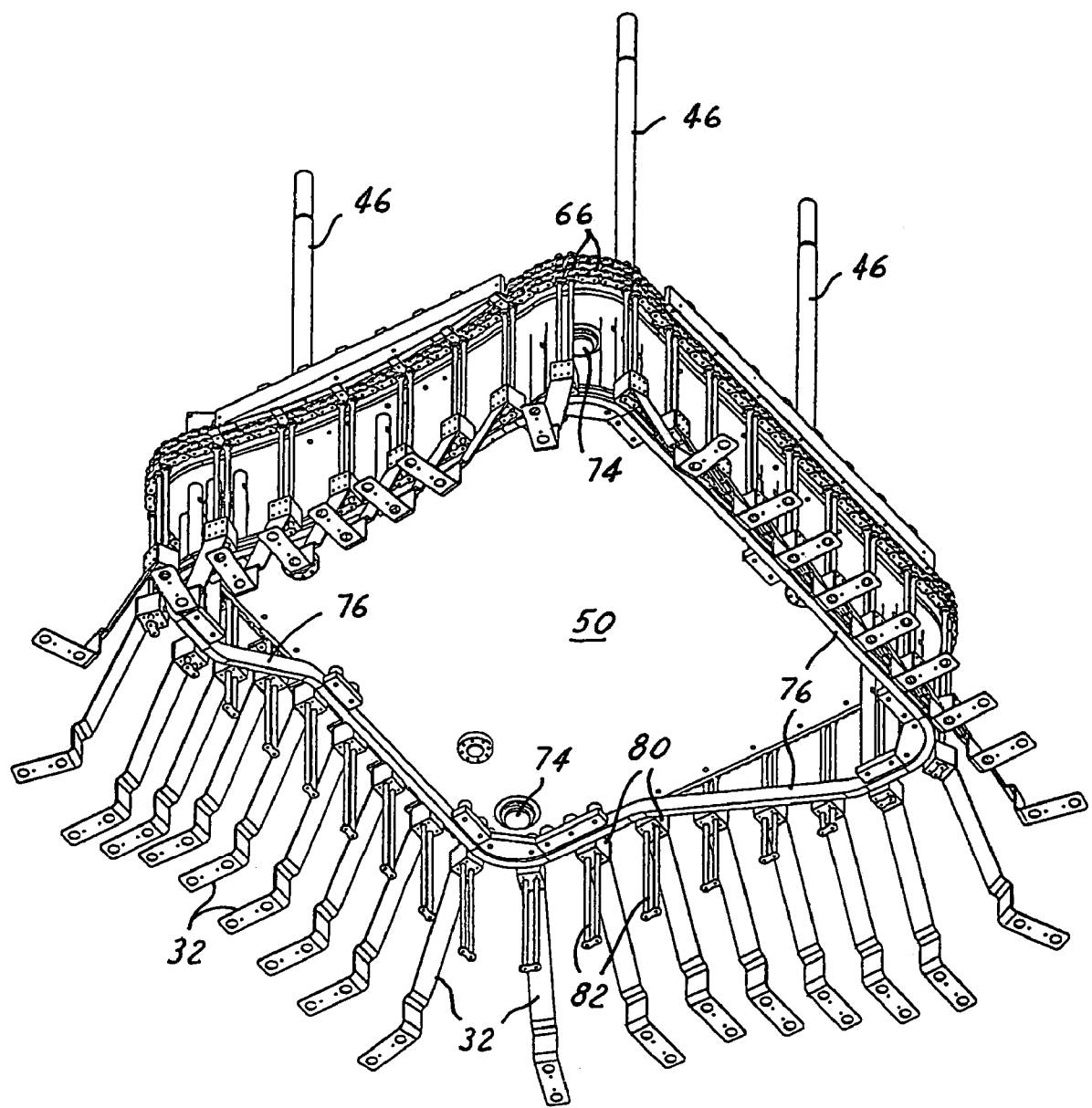
FIG. 6 is a perspective bottom view of the take-out apparatus.
Figure 29:
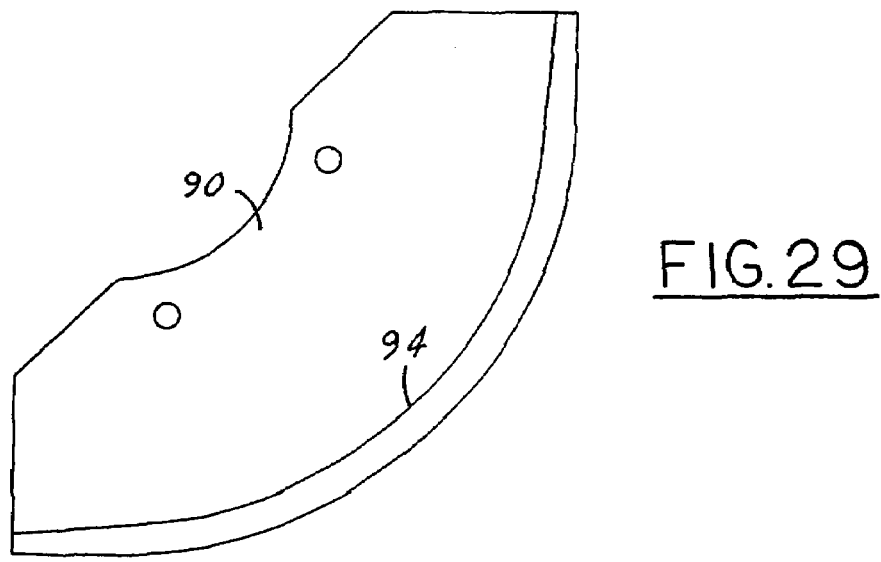
FIG. 29 is a plan view of a corner cam plate that may be employed with the takeout apparatus.
Figure 30:
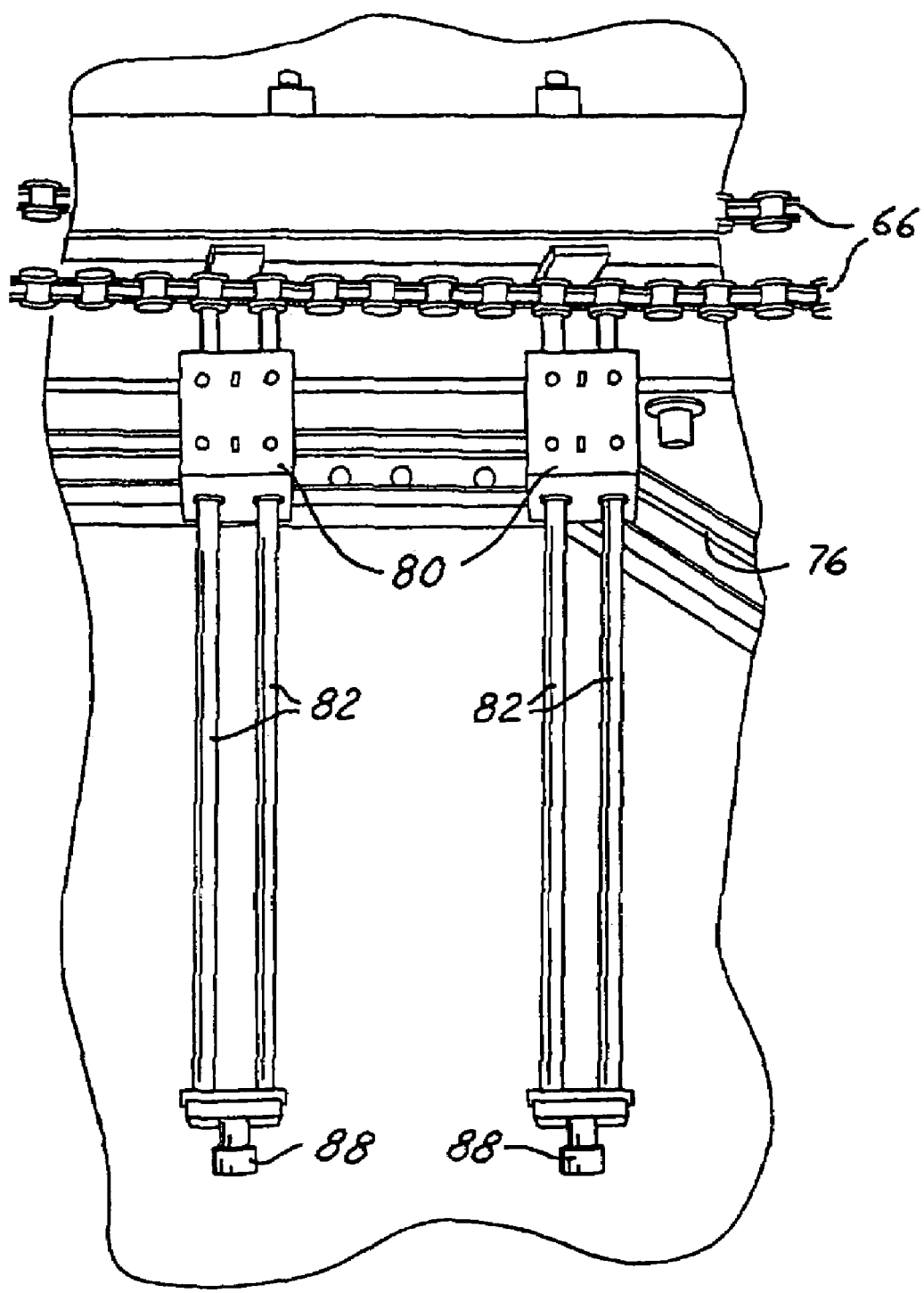
FIG. 30 is a fragmentary perspective view of a portion of a takeout apparatus including cam followers for engagement with the corner cam plate.

Each arm 32 preferably includes a block 80 slidably carried on at least one and preferably a pair of slide rods 82 to permit axial, or vertical (as viewed in FIGS. 4 and 5) slidable movement or translation toward and away from the support plate 50. Each block 80 preferably includes at least one cam follower or first roller 84 responsive to the contour of the cam track 76 and preferably disposed in the cam track 76 or engaged with an appropriate cam surface to slidably move the blocks 80 along the slide rods 82 and relative to the support plate 50. Each slide rod 82 preferably extends through a hollow passage extending through at least one chain 66 and preferably both chains 66. In this manner, the slide rods 82 replace the pivot shafts that traditionally connect adjacent links of the chains 66. Appropriate fasteners 86 can be used to retain the slide rods 82 on the chains 66. In this manner, the arms 32 are operably associated or connected to the chains 66 for movement with the chains 66 about the periphery of the support plate 50. At the opposite end of each slide rod 82, according to one presently preferred embodiment as shown in FIGS. 4 and 29, a second cam follower 88 or roller may be provided to engage one or more corner cam plates 90 carried by the support plate 50 through appropriate supports 92. The corner cam plates 90 preferably have a cam surface 94 constructed and arranged to prevent radial outward movement of the arms 32 and slide rods 82 as the arms 32 are moved around a corner of the support plate 50.

In the presently preferred embodiment, wherein the molding machine 18 includes a rotary turret 95 (FIG. 3), one or more sides 96 of the support plate 50 may be generally arcuate or curved so that the arms 32 traverse an arc as they are moved along that side 96. The curvature of the arc traversed by the arms 32 is preferably generally concave and complimentary to the path of travel of the mold tooling 20 along the turret 95 so that the arms 32 follow the motion of the mold tooling 20 to facilitate removing molded articles 12 from the mold tooling 20. To drive the arms along the curved path, the cam track 76 preferably has a complimentary contour so that engagement of the first rollers 84 with the cam surface moves the chains 66, slide rods 82 and arms 32 along the desired path. The rate at which the arms are driven by the motor 64 is also preferably controlled as a function of the rate at which the turret 95 and its mold tooling 20 are moved.

Figure 7:
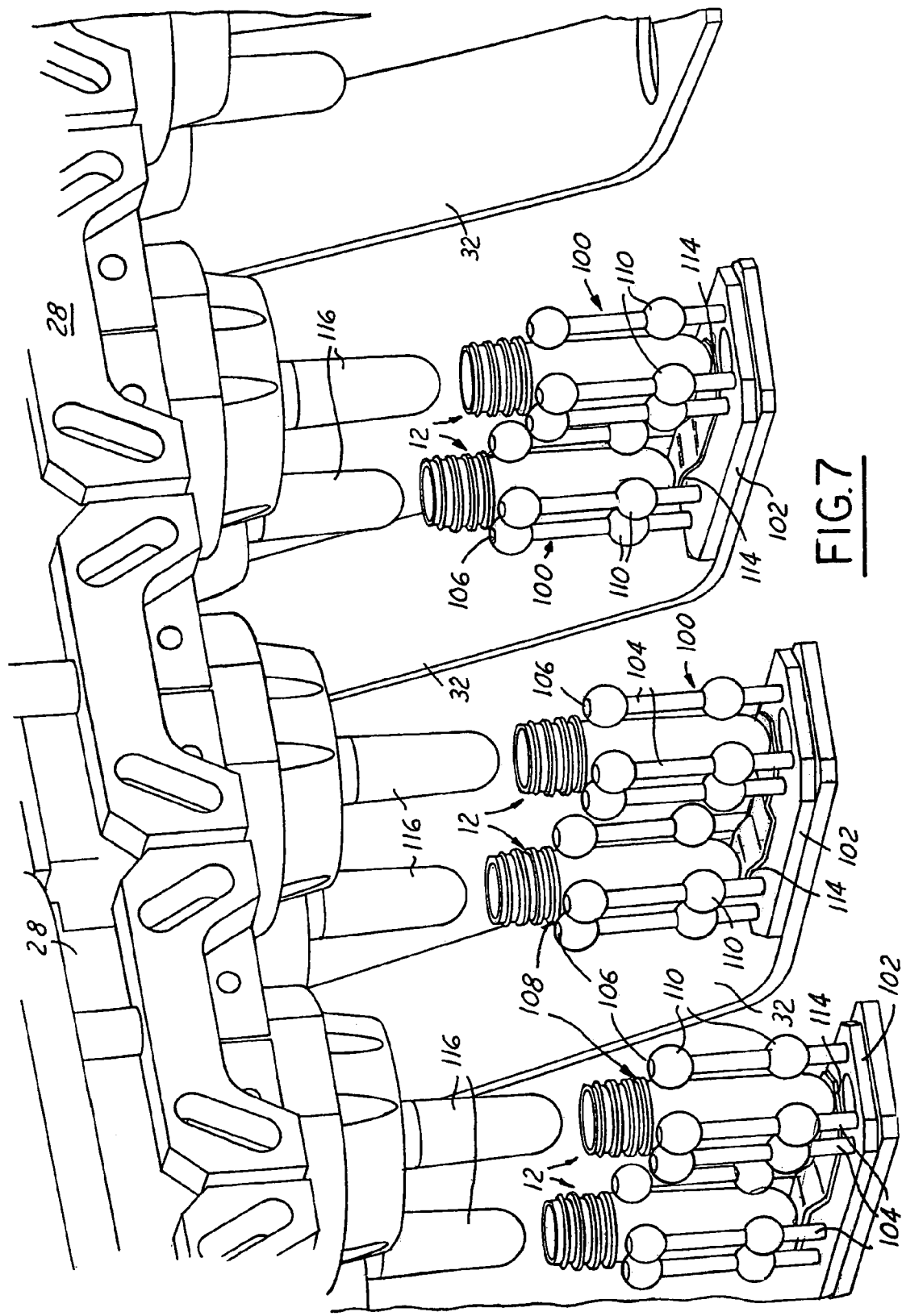
FIG. 7 is an enlarged fragmentary perspective view illustrating a plurality of arms and holders of the take-out apparatus according to one presently preferred embodiment.
Figure 8:
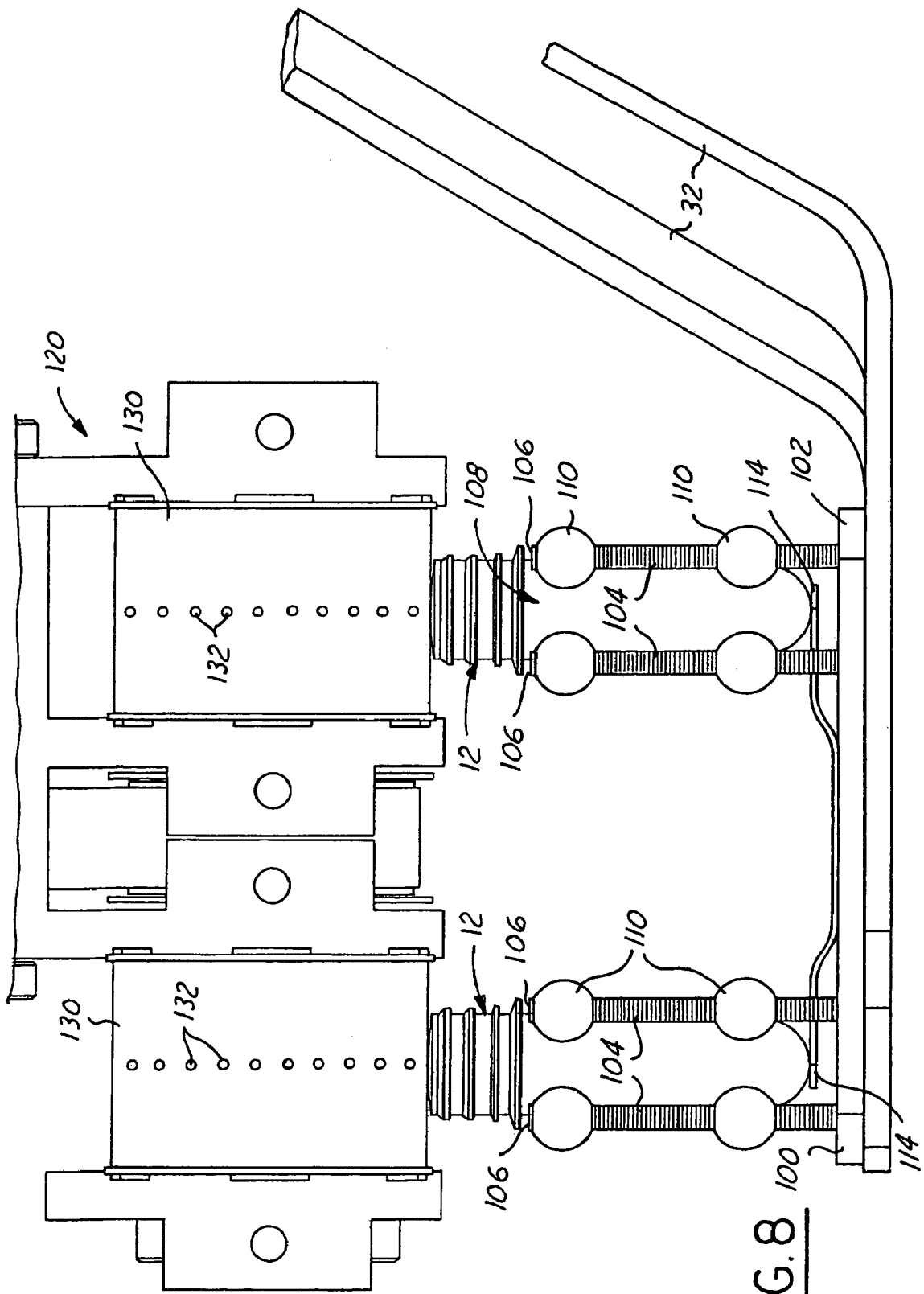
FIG. 8 is a side view illustrating holders of a take-out apparatus and the intermediate conveyor.
Figure 9:
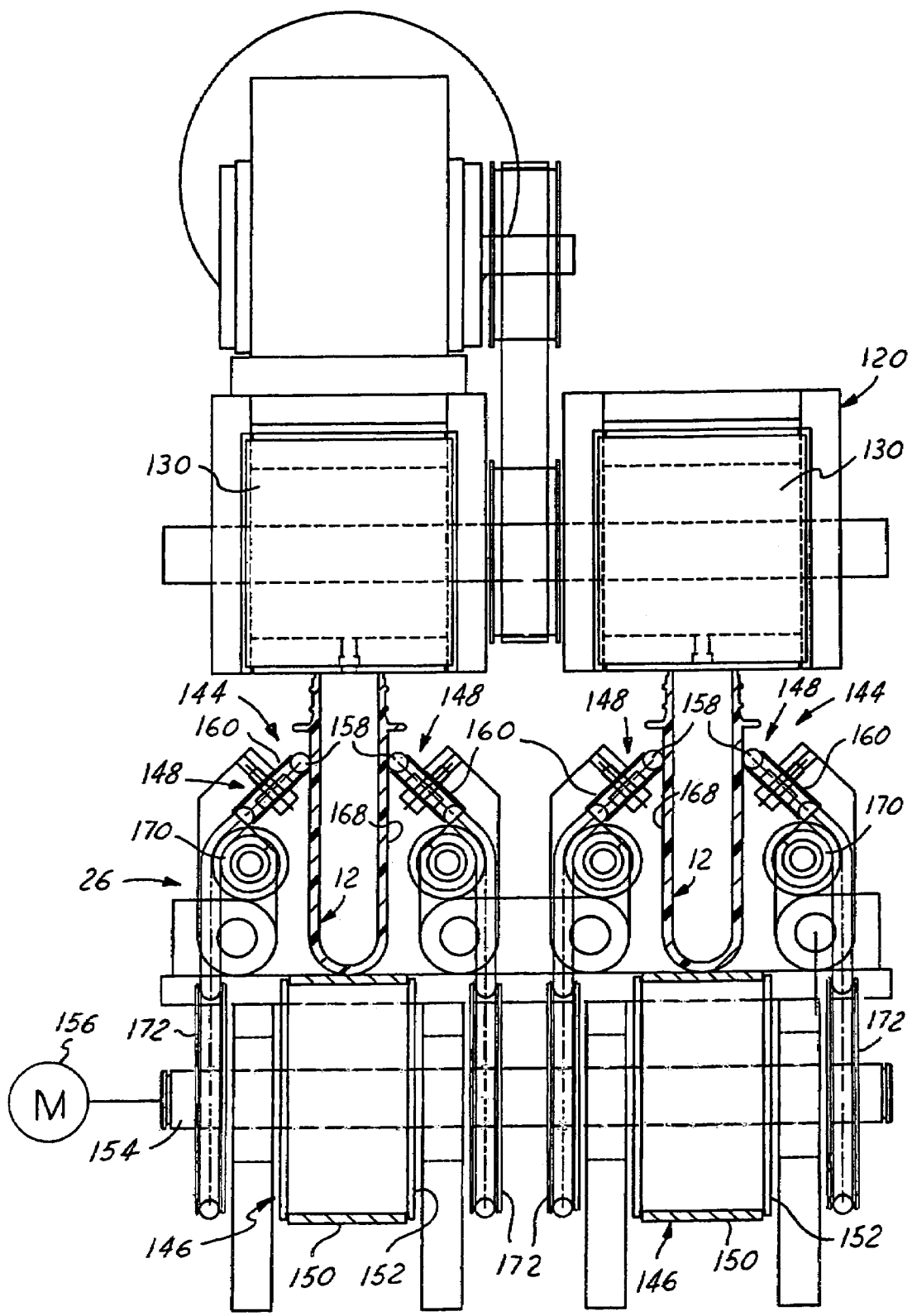
FIG. 9 is a diagrammatic view illustrating the cooling station and the cooling conveyor within the cooling station.

As best shown in FIGS. 7 and 8, according to one embodiment, each arm 32 includes at least one and preferably a pair of holders 100 with each holder 100 adapted to receive a separate molded article 12, so that each arm 32 preferably carries a pair of molded articles 12 away from the mold tooling 20. Each pair of holders 100 is preferably mounted to a carrier plate 102 that is fixed to a corresponding arm 32. In this embodiment, each holder 100 includes a plurality of upstanding fingers 104 fixed at one end to the carrier plate 102 and having an opposed free end 106. A receptacle 108 is defined between the fingers 104 of each holder 100 with a molded article 12 adapted to be received in the receptacle 108. The fingers 104 may include contact members 110 that extend from a finger into the receptacle 108 defined between the fingers 104. The contact members 110 are arranged to limit the surface area or points of contact between the holder 100 and a molded article 12 carried by the holder 100. In one embodiment the contact members 110 may be generally curved, and are preferably at least partially spherical, and two spaced apart contact members 110 may be provided on each finger 104. The shape and number of contact members 110 can be varied as desired for a particular application.

Each finger 104 is preferably flexible and resilient to limit the force applied to a molded article 12 if, for example, the molded article 12 is offset or misaligned slightly from the receptacle 108. The flexible fingers 104 also prevent damage to the arms 32 should they encounter interference, and may be constructed and arranged to break away at a force low enough to prevent damage to the associated arm 32 in such a situation. In one presently preferred embodiment, the fingers 104 are composed of coil springs having a stiffness chosen to adequately support and retain the molded articles 12 without applying undesirable pressure to the molded articles 12 through the contact members 110.

In addition to the fingers 104, each receptacle 108 is preferably also defined at least in part by a flexible support 114 carried by the carrier plate 102. The flexible supports 114 are arranged to support a lower surface of the molded articles 12 and may be formed relatively inexpensively from spring steel. The flexible supports 114 for both receptacles 108 defined on each arm 32 can be formed from a single spring member attached to the carrier plate 102 between its ends, with each end being cantilevered so that it is flexible, resilient and extends into a corresponding receptacle 108.

Desirably, the receptacles 108 of each holder 100 are aligned with a mold core 116 (FIG. 7) of the mold tooling 20 to receive a molded plastic article 12 off of the mold core 116 and to convey the molded articles 12 away from the mold tooling 20. In the embodiment shown, each set of mold tooling 20 includes mold cores 116 in radially aligned pairs. So the holders 100 and receptacles 108 of each arm 32 in this embodiment are constructed to be aligned with the pairs of mold cores 116 along a predetermined portion of the path of movement of the mold cores 116 when the mold tooling halves 28, 30 are separated or open. In one embodiment, each mold tooling pair 20 defines four mold cavities (in two pairs of radially aligned cavities) and forms four molded articles 12 in each cycle. In this embodiment, two arms 32 are needed to remove the four molded articles 12 from each mold tooling pair 20. The arms 32 are driven at a rate that is a function of the rotational speed of the turret 95 to ensure that the holders 100 are properly aligned with and ready to receive the molded articles 12 as they are stripped from the mold cores 116. To do this, the servo-controlled motor 64 that drives the arms 32 can be communicated with an appropriate controller 65 that is responsive to the rate of rotation of the turret 95 and/or the rotational position of the turret 95.

As best shown in FIGS. 2-5, 8 and 14-17, the system 10 preferably includes an intermediate conveyor 120 disposed between the takeout apparatus 24 and the cooling station 26. The intermediate conveyor 120 preferably includes an infeed section 122 wherein molded plastic articles 12 are transferred from the takeout apparatus 24 to the intermediate conveyor 120, and an outfeed section 124 wherein molded plastic articles 12 are transferred from the intermediate conveyor 120 to the cooling station 26. The intermediate conveyor 120 may be carried by the support plate 50 of the takeout apparatus 24 by upstanding posts 126 and generally transverse brackets 128 fixed to the support plate 50. In one presently preferred embodiment, the intermediate conveyor 120 includes at least one and preferably a pair of parallel belts 130 communicated with a vacuum source to retain the molded plastic articles 12 on the belts 130 under a vacuum force. To do this, the belts 130 are permeable, and may be perforated including a series of holes 132 (FIGS. 8 and 14) through which air is drawn under the vacuum.

As best shown in FIG. 8, at the infeed section 122 of the intermediate conveyor 120 the takeout arms 32 are oriented so as to engage an upper end of the molded articles 12 with the belts 130 of the intermediate conveyor 120. Desirably, each of the pair of molded articles 12 carried by an arm 32 is aligned with a separate one of the belts 130 and generally simultaneously transferred from the takeout apparatus 24 to the intermediate conveyor 120. Each belt 130 is preferably looped around a pair of shafts or pulleys 134 carried by side plates 136 of the intermediate conveyor 120. One of the pulleys 134 is driven by a motor 138 via a drive pulley 140 driven by the motor 138 and a belt 142. Of course, any number of pulleys 134 can be utilized. The molded articles 12 are preferably suspended from the belts 130 and guided along a straight path from the infeed section 122 to the outfeed section 124.

As shown in FIGS. 9-13, from the outfeed section 124 of the intermediate conveyor 120 the molded articles 12 are transferred to one or more cooling conveyor systems 144 passing through the cooling station 26 and adapted to convey the molded articles 12 through the cooling station 26. In one embodiment, the cooling station 26 includes two parallel cooling conveyor systems 144 each generally aligned with a separate one of the belts 130 of the intermediate conveyor 120. Each cooling conveyor system 144 includes a lower conveyor 146, and a pair of side conveyors 148. The lower conveyor 146 includes a belt 150 driven by a pulley 152 carried by a shaft 154 that is driven by a motor 156. The belt 150 is adapted to engage a lower end or bottom surface of a molded article 12 as the molded article 12 passes through the cooling station 26.

Figure 11:
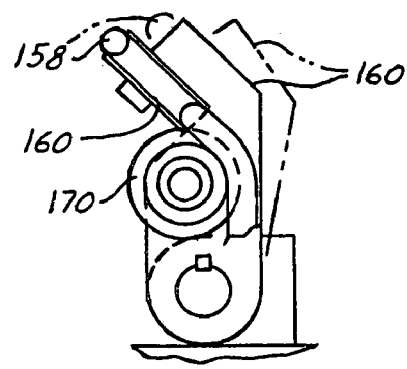
FIG. 11 is a fragmentary side view of one portion of the cooling conveyor as shown in FIG. 9.

Each of the pair of side conveyors 148 preferably includes a belt 158 wrapped around at least a pair of pulleys 160 with one pulley 160 at an infeed section 164 of the cooling station 26 and the other pulley (not shown) at the outfeed section 166 of the cooling station 26. If desired, multiple pulleys may be provided between the infeed section 164 and outfeed section 166 providing additional support for the belt 158. Each side conveyor belt 158 is adapted to engage a sidewall 168 of the molded articles 12 so that the molded articles 12 are supported in an upright position as they are carried through the cooling station 26 by the side conveyors 148 and lower conveyor 146. Each belt 158 may be wrapped partially about a guide pulley 170 and around a driven pulley 172 fixed to the shaft 154 and driven by the motor 156 so that each belt 158 of the side conveyors 148 and the belt 150 of the lower conveyor 146 are driven by the same shaft 154 and motor 156. As best shown in FIG. 11, each guide pulley 170 and the pulleys 160, 162 between the infeed section 164 and outfeed section 166 are preferably pivotally or adjustably mounted to permit the distance between the side conveyors 148 to be adjusted to accommodate plastic articles 12 of different sizes.

Figure 10:
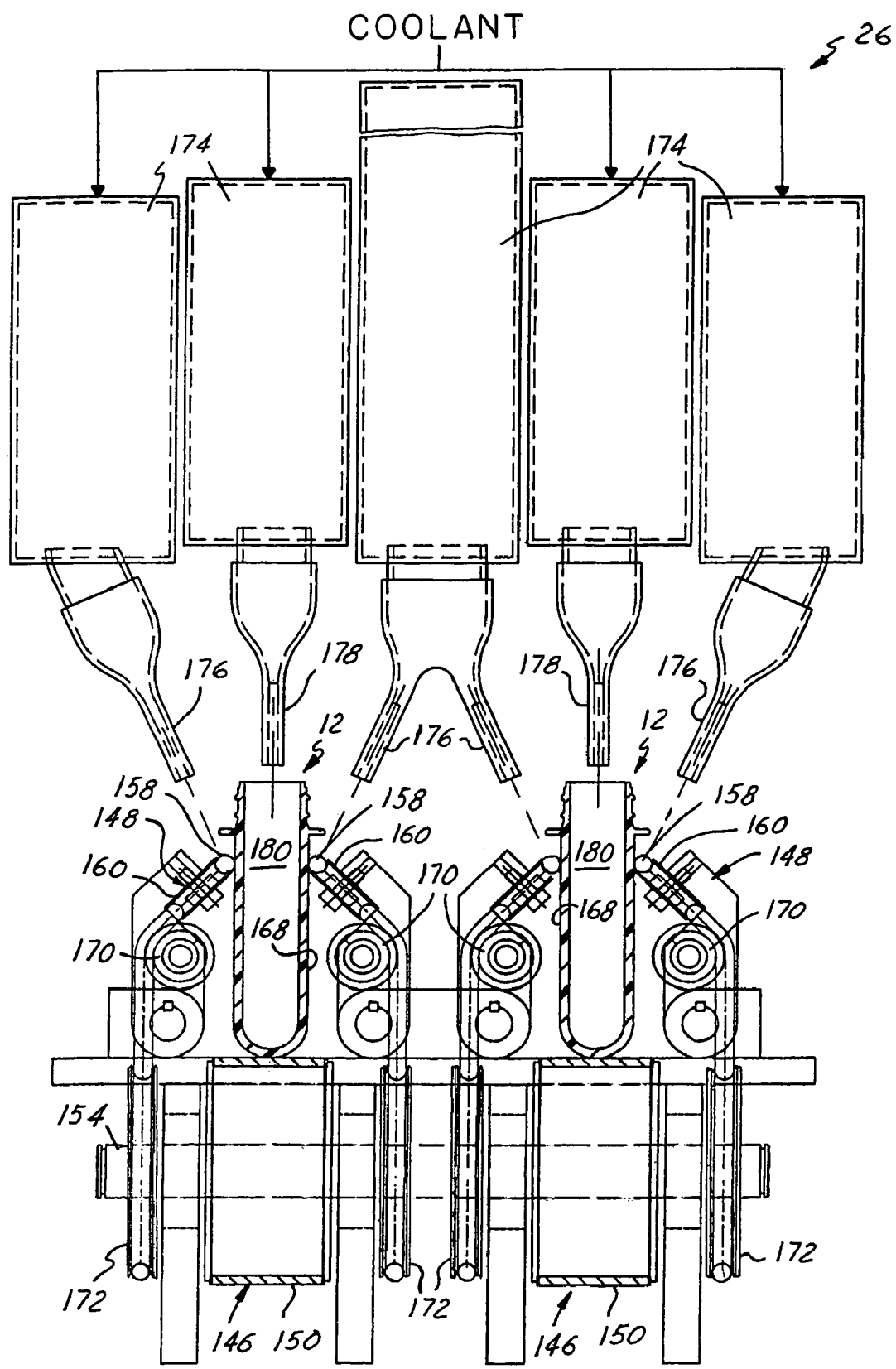
FIG. 10 is a diagrammatic view illustrating a cooling station and cooling conveyor according to one presently preferred embodiment.
Figure 12:
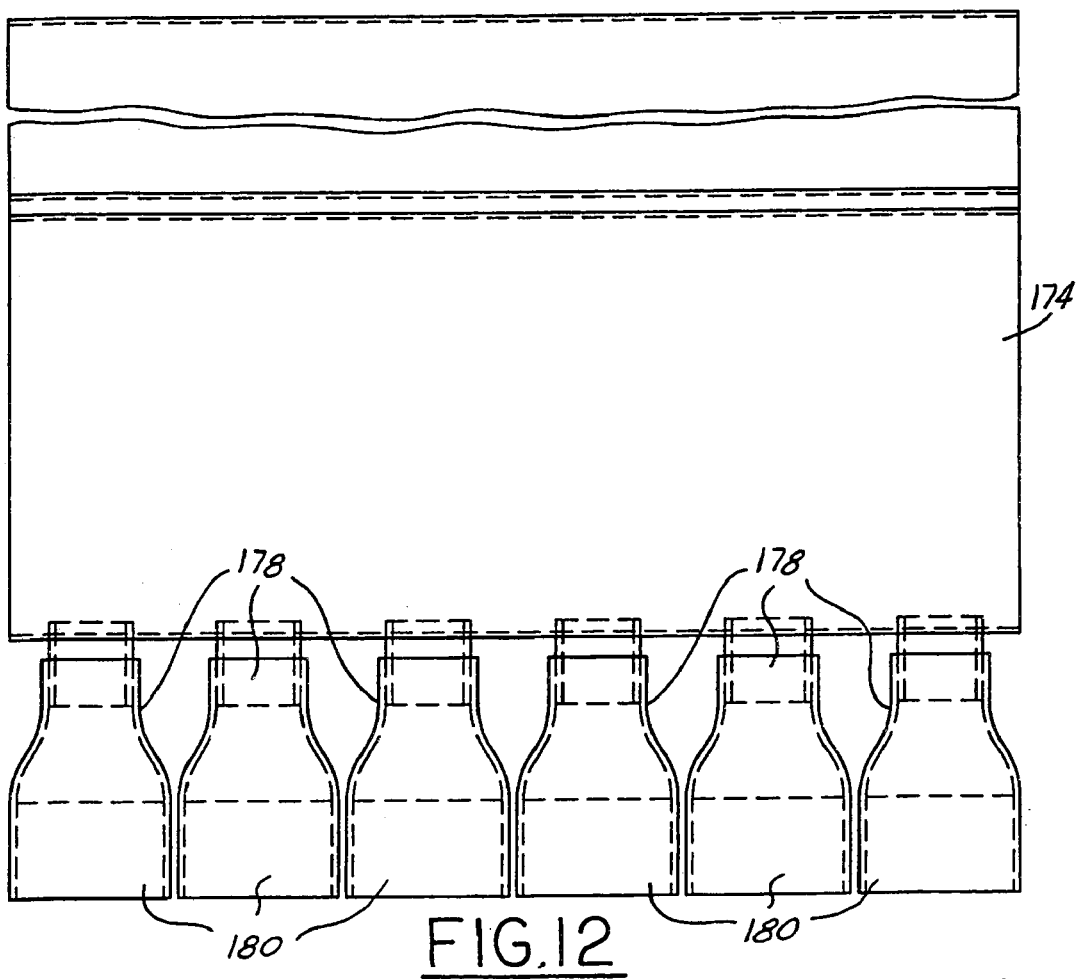
FIG. 12 is a side view of a plurality of elongate fluid outlets aligned to provide a substantially continuous stream of coolant onto molded articles in the cooling station.

As best shown in FIGS. 10 and 12, in one embodiment, the cooling station 26 preferably includes one or more plenums 174 or manifolds communicating with a plurality of nozzles having an outlet directed towards the cooling conveyors, and more specifically toward the molded articles 12 conveyed by the cooling conveyors 146, 148. Coolant, which is preferably chilled forced air as applied to container preforms, is directed onto the molded articles 12, preferably at various locations on and/or in the molded articles 12. As shown in this embodiment, coolant is directed by a series of laterally spaced side nozzles 176 onto the exterior sidewall 168 of the molded articles 12, and by a series of central nozzles 178 into an interior cavity 180 of the molded articles 12. The coolant can also be compressed air or a liquid, such as water, by way of examples without limitation.

Figure 13:
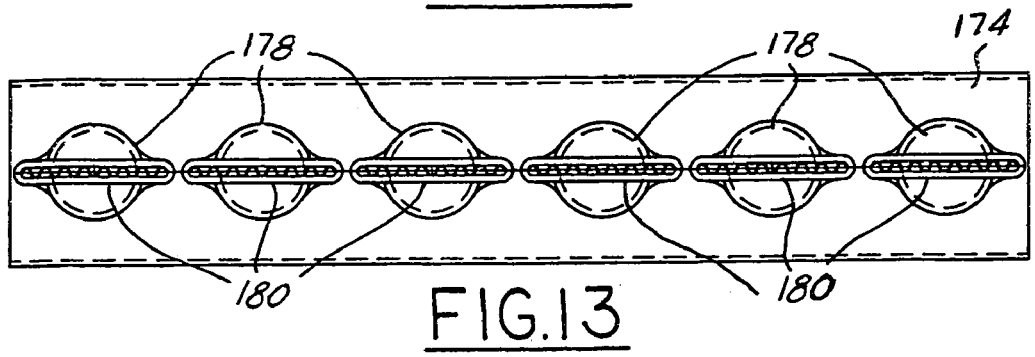
FIG. 13 is an end view of the portion of the cooling station shown in FIG. 12 illustrating the aligned elongate fluid outlet.

As best shown in FIGS. 12 and 13, multiple aligned central nozzles 178 are preferably provided between the infeed section 164 and outfeed section 166 of the cooling station 26. The side nozzles 176 are preferably similarly arranged in series and aligned. The nozzles 176, 178 preferably include elongate fluid outlets 180 that preferably provide a relatively wide stream of coolant rather than a small jet of coolant such as may be delivered from a small circular nozzle. The nozzles 176, 178 are preferably aligned with minimal spacing between them providing an at least substantially continuous stream or curtain of coolant onto the molded plastic articles 12 as they pass through the cooling station 26. To maximize the cooling efficiency, the streams of coolant directed toward and into the molded articles 12 are preferably continuous along the length of the cooling station 26. To accomplish this in the present embodiment, the nozzles 176,178 can be constructed and arranged so that the discharge pattern of the nozzles 176,178 join or overlap at or prior to engagement with the molded articles 12. Accordingly, coolant is preferably continually provided on and into the molded articles 12 without interruption as the molded articles 12 are moved through the cooling station 26.

In FIGS. 16-23, 28 and 31, a second presently preferred embodiment of a cooling station 200 is shown. Like the first embodiment cooling station 26, the second embodiment cooling station 200 preferably includes a pair of cooling conveyors 202 providing parallel paths each adapted to receive molded articles 12 therein and to transfer the molded articles 12 through the cooling station 200. The cooling station 200 includes a pair of coolant supply conduits 204 communicated with a supply of coolant, such as a blower providing forced air, a compressed air source, or a liquid coolant source. Branch conduits 206 extend from the supply conduits 204 to both a pair of upper main plenums 208 (one for each conveyor path) and a pair of lower main plenums 210 (also one for each conveyor path) respectively disposed above and below the cooling conveyors 202. The cooling station 200 may be supported by appropriate legs 211 of a frame 244.

Figure 31:
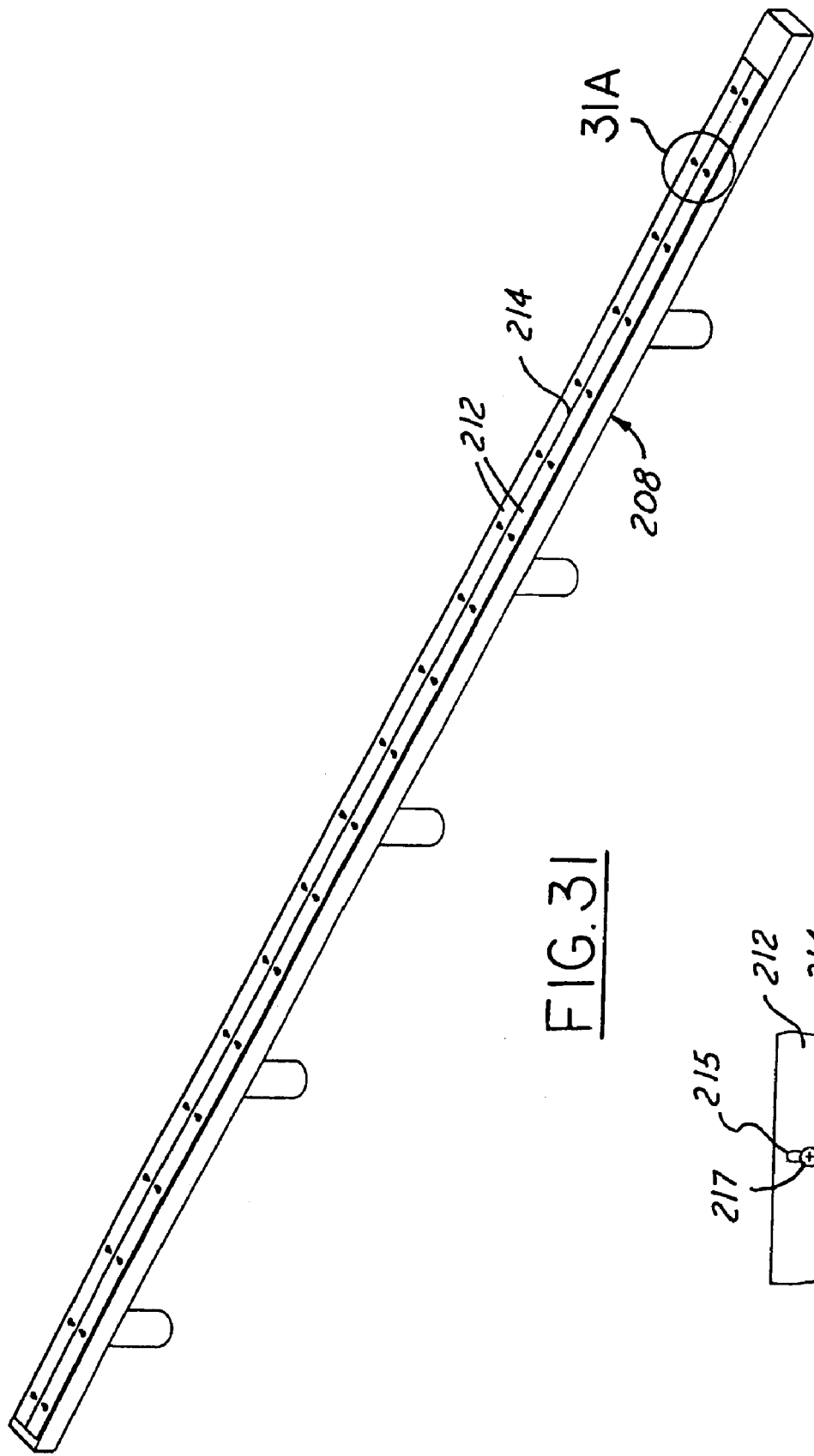
FIG. 31 is a perspective view of a plenum of the second embodiment cooling station.
Figure 31A:
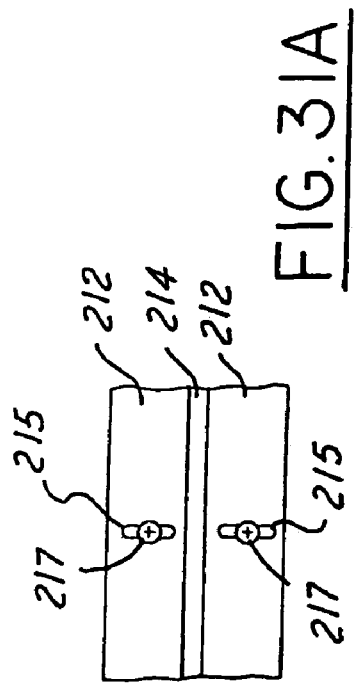
FIG. 31A is an enlarged fragmentary view of the encircled portion 31A in FIG. 31 showing a portion of adjustable plates that define a fluid outlet in the cooling station.

The upper and lower plenums 208, 210 may be similarly constructed to define an elongate, preferably continuous enclosure in which coolant is received. Each plenum 208, 210 is defined at least in part by one or more fluid outlet plates 212 that define an elongate and preferably at least substantially continuous fluid outlet 214 through which coolant is discharged from each plenum 208 and toward molded articles 12 being conveyed through the cooling station 200. In one presently preferred embodiment, each elongate fluid outlet 214 is defined by a pair of elongate plates 212 fixed to the associated plenum 208, 210 with a linear slot between the plates 212 defining the fluid outlet 214. Preferably, the plates 212 include outwardly extending flanges 216 which may be adjustably carried or connected to an associated plenum 208, 210 to permit the size and location of the fluid outlet 214, relative to molded articles 12 conveyed through the cooling station 200, to be changed. The plates 212 may include slots 215 (FIG. 31A) that receive fasteners 217 and permit movement of the plates 211 relative to the fasteners 217.

In one presently preferred embodiment, the plates 212 are generally L-shaped in section and include flanges 218 extending into an associated plenum 208, 210 and defining a passage 220 communicating with the fluid outlet 214 through which coolant flows from the plenum 208, 210 to the fluid outlet 214. In the presently preferred embodiment, the fluid outlet 214 is continuous and extends without interruption from a location generally adjacent to the infeed section 222 of the cooling station 200 to the outfeed section 224 of the cooling station 200. Accordingly, rather than discreet or individual coolant nozzles, in this embodiment, a continuous and preferably generally linear stream, curtain or knife of coolant is provided onto the molded articles 12 as they are conveyed through the cooling station 200.

Figure 28:
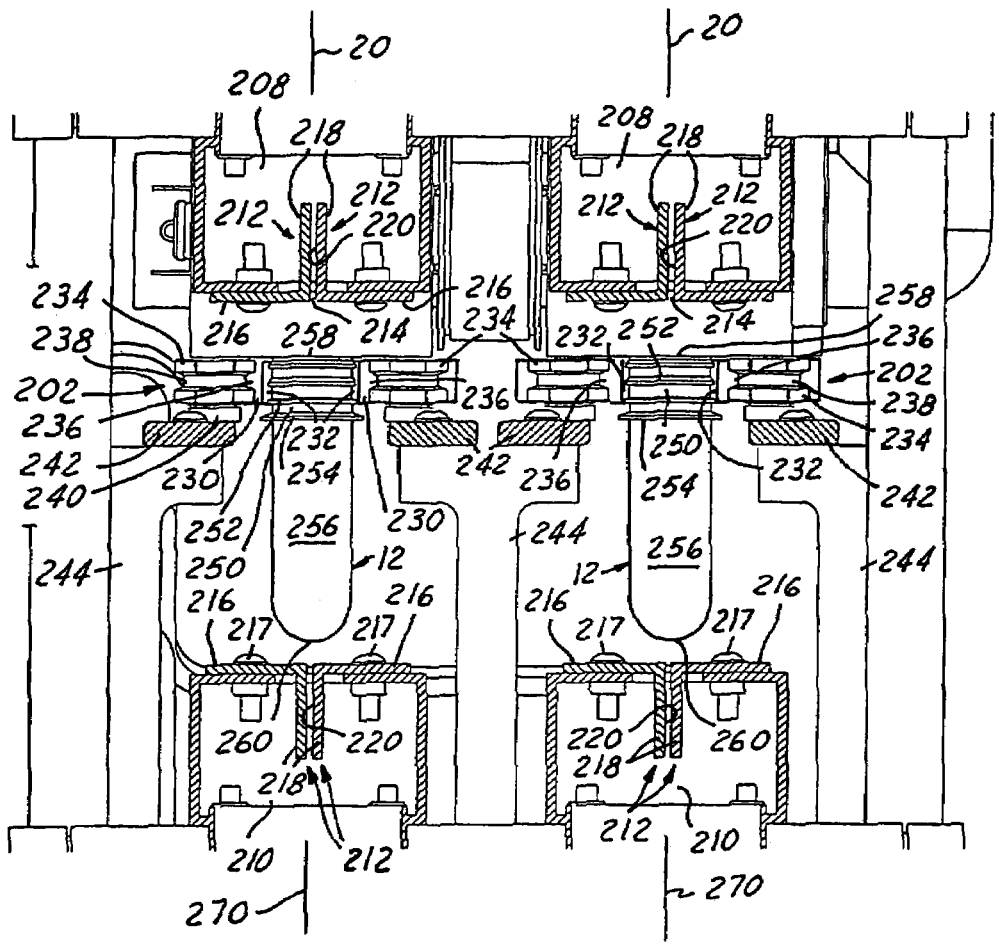
FIG. 28 is an end view of the second embodiment cooling station.

To convey the molded articles 12 through the cooling station 200, two spaced cooling conveyors 202 are provided. As best shown in FIG. 28, each cooling conveyor 202 preferably includes a pair of belts 230 having generally opposed planar faces 232 adapted to engage diametrically opposed surfaces of the molded articles 12 preferably with a friction fit to carry and convey the molded articles 12 through the cooling station 200. The opposed faces 232 of the belts 230 preferably extend axially relative to the molded plastic articles 12 and are generally continuous from the infeed section 222 to the outfeed section 224 of the cooling station 200. The belts 230 are preferably trained around a plurality of pulleys 234 and include an outwardly extending projection 236 adapted to be received in a complementary track or groove 238 formed in each pulley 234 to facilitate retaining and locating the belts 230 relative to the pulleys 234. In one presently preferred embodiment, the projection 236 on each belt 230 may be generally V-shaped or trapezoidal including three generally straight outer edges in section. At least one pulley 234 associated with each belt 230 of each cooling conveyor 202 is driven, such as by a motor 235 (FIG. 22), for rotation to advance the belt 230 along the pulleys 234 and thereby advance the molded articles 12 carried by the belts 230. The pulleys 234 are preferably mounted on shafts 240 fixed to plates 242 that are in turn adjustably carried by a frame 244 of the cooling station 200. Each pulley 234 may be adjustable relative to the plate 242 on which it is received to facilitate desired alignment of the pulleys 234 on the plates 242, and the plates 242 can preferably be adjusted relative to the frame 244 to adjust the position of the pulleys 234 and belts 230 relative to molded articles 12 in the cooling station 200. Accordingly, the distance between the belts 230 of a cooling conveyor 202 can be adjusted so that molded articles 12 of varying sizes can be accommodated by the cooling station 200.

In one presently preferred embodiment, the cooling station 200 is employed to cool molded plastic preforms 12 including a generally cylindrical finish 250 preferably having a plurality of external threads 252, and a radially outwardly extending flange 254 between the finish 250 and a main body 256 of the preform. In the preferred embodiment, the belts 230 are arranged to frictionally engage the threads 252 on the finish 250 of each preform at a location axially spaced from the flange 254. When carried and conveyed in this manner, the open upper end 258 of the preforms 12 are exposed to the fluid outlets 214 of an associated upper plenum 208 and the lower portion of the preforms, shown here as a closed semi-spherical end 260, are exposed to the elongate fluid outlet 214 of an associated lower plenum 210.

Accordingly, a stream of coolant is directed into the open upper ends 258 of each preform 12, and against the closed lower end 260 of each preform 12. The stream of coolant directed against the lower end 260 of the preforms 12 preferably flows upwardly and around a side wall 168 of the preforms 12 improving the cooling performance. Because the plates 242 defining the fluid outlets 214 are adjustable relative to the plenums 208, 210 the location of the fluid outlets 214 relative to an axis 270 of the preforms 12 can be adjusted. The streams of coolant discharged from the fluid outlets 214 can be arranged to be coincident with a plane including the axis 270 of each preform 12 along the cooling conveyor 202. The fluid outlets 214 can also be moved so that the streams are parallel but spaced from the plane containing the axis 270 of each preform 12. And the plates 242 can be adjusted so that the direction of the streams is not parallel to the plane containing the axes 270 of the preforms. In that arrangement, the stream may intersect the plane containing the axes 270 of the preforms 12, or may be entirely separate from that plane, at least from the fluid outlet 214 to the upper end 258 of the preforms 12.

The fluid outlet 214 of the upper plenum 208 is preferably offset from the plane containing the axes 270 of the preforms to provide a more turbulent flow within the preforms and improved flow into and out the preforms avoiding a stagnant section or layer of coolant in the interior of the preforms 12 to improve fluid flow and more evenly cool the preforms 12. The upper plenum 208 may be formed in two sections, and each section of the upper plenum 208 may be separately adjusted so that they direct coolant onto or into the preforms 12 at different locations or in generally different directions. This may provide more even cooling of the preforms 12.

Also preferably, the fluid outlet 214 of the lower plenum 210 is directed along or coincident with the plane containing the axes 270 of the preforms 12 so that the coolant engages the lower end 260 of the preforms 12 and flows generally evenly around the exterior of the preforms to improve the cooling properties thereof. Of course, the width of both the upper and lower fluid outlets 214 can be adjusted as desired, for example by moving the plates 212 further apart from each other.

In one presently preferred embodiment, the coolant is chilled forced air. The air may be passed through a heat exchanger to cool it, and then moved by one or more blowers through the fluid conduits 204, 206 and into the upper and lower plenums 208, 210. The temperature of the chilled air can vary widely, and in one presently preferred embodiment may be between 30° and 80° F., preferably around 40° to 60° F. The flow rate of coolant provided through the fluid outlets 214 can also be changed as desired as a function of the flow area of the fluid outlet 214, as well as the flow rate of fluid delivered to the plenums 208, 210. Other coolants may be used, including by way of example without limitation, compressed air and/or liquid coolants, such as water. Additionally, the cooling conveyors 202 may convey the preforms 12 through a coolant bath such as by passing the preforms 12 through a pool or bath of water or other coolant.

Preferably, the cooling conveyors 202 are driven at a rate that is slower than the rate at which the intermediate conveyor 120 is driven to reduce the pitch or spacing between adjacent preforms 12 and thereby increasing the time that the preforms 12 spend in the cooling station 26, 200. This increases the efficiency of the cooling station 26, 200 by increasing the potential cooling available per length of cooling station 26, 200 and also reduces the required floor space for the apparatus.

An alternate embodiment holder assembly 300 for the take-out apparatus 24 is shown in FIGS. 24-27. This embodiment preferably includes a carrier plate 302, and a pair of flexible supports 304, that may be formed on a single strip of bent spring steel, as set forth with regard to the previous embodiment holders 100. The holders 300 themselves, like the previous embodiment, preferably include a plurality of upstanding fingers 306 and also preferably include at least one contact member 308 carried by the fingers 306 and defining in part a receptacle 310 between the fingers 306.

In the embodiment shown, each holder 300 includes four upstanding, flexible and resilient fingers 306 and a pair of axially spaced contact members 308. Each contact member 308 is preferably annular, and is fixed to the fingers 306 so that openings 312 of associated contact members 308 are coaxially aligned. To facilitate alignment of a molded article 12 with a receptacle 310, the openings 312 through the contact members 308 preferably have an entrance portion 314 that is beveled or tapered. The flexible and resilient fingers 306 can be formed from appropriate springs, as set forth with regard to previous embodiment. The springs or other finger arrangement are preferably received through circumferentially spaced bores 315 in the contact members 308. The contact members 308 can be retained on the fingers 306 by set screws 316 disposed in radial 318 bores in the contact members 308 and extending into engagement with the fingers 306. Desirably, the annular contact members 308 are generally thin in the axial direction to limit the surface area or contact area of the contact members 308 with the molded plastic articles 12. Any number and arrangement of contact members 308, or no contact members, may be provided for each holder 300, as desired.

In use, the molding machine 18 produces a plurality of molded articles 12, such as molded plastic preforms 12 that are subsequently processed or formed into plastic containers. The mold tooling 20 may include a female mold cavity and a male mold core 116 removably disposed in the mold cavity to form a preform 12. When the mold tooling halves 28, 30 are separated after a compression molding cycle, the preforms 12 are preferably carried by the mold cores 116 so that they are removed from the mold cavities when the mold tooling halves 28, 30 are separated.

During this time, an arm 32 of the take-out apparatus 24 is disposed beneath a pair of aligned mold cores 116 so that when the preforms 12 are released from the mold cores 116 the preforms 12 are disposed in the receptacles 108, 310 of the holders 100, 300 on the arm 32. The arm 32 continues to be driven about the periphery of the support plate 50 to carry the molded preforms 12 away from the molding machine and toward the intermediate conveyor 120. In the area of the infeed section 122 of the intermediate conveyor 120, the arms 32 are arranged so that the upper end of each preform 12 is generally aligned with an associated belt 130 of the intermediate conveyor 120. Desirably, the upper end of each preform 12 is brought into engagement with its associated belt 130 as the take-out arms 32 are driven relative to the intermediate conveyor 120. To prevent excessive force from being applied to the preforms 12 as they are brought into engagement with the belts 130, the flexible supports 114, 304 in the receptacle 108 are designed to flex to limit or prevent damage to the preforms under this load. The preforms are then held on the vacuum belt 130 under vacuum force, and the take-out arms 32 can be lowered away from the intermediate conveyor 120 as controlled by engagement of the cam followers 84 with the cam track 76 of the take-out apparatus 24.

The preforms 12 continue along the intermediate conveyor 120 until they reach the outfeed section 124 whereupon they are transferred to the cooling conveyors 146, 148, 202 of the cooling station 26, 200. Preforms 12 are carried by the belts 150, 158, 230 of the cooling conveyors 146, 148, 202 through the cooling station 26, 200 wherein one or more streams of coolant are directed at and into the preforms 12 to cool them. Hence, the preforms 12 are moved to and through the cooling station in-line with a plurality of preforms 12 being simultaneously cooled as they are moved through the cooling station. The preforms 12 are at least substantially continuously cooled as they are moved in-line through the cooling station, and are preferably continuously cooled by a continuous stream of fluid directed at the preforms as they are moved along at least a portion of the cooling path or cooling station. As noted herein, a plurality of lines of preforms may be formed for increased production rate and efficiency. While the terms "in-line" and "lines" have been used to describe the consecutive travel of the preforms 12, it is to be understood that the preforms do not have to travel linearly. Curved lines or other configurations can be employed.

While certain preferred embodiments and constructions and arrangements of particular components of the takeout and cooling system and method have been shown and described herein, one of ordinary skill in this art will readily understand that modifications and substitutions can be made without departing from the spirit and scope of the invention as defined by the appended claims. Further, relative adjectives like "upper," "lower," "central," and the like are used to describe features of system, apparatus and method with respect to the position and orientation of such features as shown in the accompanying drawings of the presently preferred embodiments.

The invention claimed is:

1. A system for removing molded articles from a molding machine and cooling the molded articles, the system including:

a takeout apparatus having a plurality of arms adapted to receive molded articles from the molding machine and to convey molded articles from the molding machine, the arms being driven in an endless path to transfer molded articles from the molding machine;

an intermediate conveyor having an infeed section adjacent to at least a portion of the takeout apparatus to receive molded articles from the takeout apparatus and convey molded articles away from the takeout apparatus and an outfeed section from which molded articles leave the intermediate conveyor;

a cooling station through which the molded articles pass and including at least one fluid outlet through which a fluid is directed toward the molded articles to cool them;

a cooling conveyor having an infeed section adjacent to the outfeed section of the intermediate conveyor to receive molded articles from the intermediate conveyor and an outfeed section from which molded articles are removed from the cooling station; and wherein the cooling conveyor advances molded articles at a slower rate than does the intermediate conveyor to reduce the spacing between adjacent molded articles and increase the time that the molded articles are in the cooling station.

2. The system of claim 1 wherein the molding machine includes a plurality of radially aligned pairs of mold tooling and produces two radially aligned molded articles for each cycle of each pair of radially aligned mold tooling, each arm of the takeout apparatus includes two receptacles with each receptacle adapted to receive one of the two radially aligned molded articles, the intermediate conveyor including two conveyor paths with each conveyor path adapted to transfer one of the two radially aligned molded articles, and the cooling conveyor including two conveyor paths with each conveyor path adapted to transfer one of the two radially aligned molded articles.

3. A system for removing molded articles from a molding machine and cooling the molded articles, the system including:

a takeout apparatus having a plurality of arms adapted to receive molded articles from the molding machine and to convey molded articles from the molding machine, the arms being driven in an endless path to transfer molded articles from the molding machine;

an intermediate conveyor having an infeed section adjacent to at least a portion of the takeout apparatus to receive molded articles from the takeout apparatus and convey molded articles away from the takeout apparatus and an outfeed section from which molded articles leave the intermediate conveyor;

a cooling station through which the molded articles pass and including at least one fluid outlet through which a fluid is directed toward the molded articles to cool them;

a cooling conveyor having an infeed section adjacent to the outfeed section of the intermediate conveyor to receive molded articles from the intermediate conveyor and an outfeed section from which molded articles are removed from the cooling station; and wherein the intermediate conveyor includes a perforated belt communicated with a vacuum source and adapted to engage an upper end of the molded articles to suspend the molded articles from the perforated belt under a vacuum force.

4. The system of claim 3 which also includes a cam associated with the takeout apparatus and wherein each arm of the takeout apparatus includes a follower responsive to a contour of the cam to bring at least one molded articles carried by the arm into engagement with the perforated belt, and thereafter to drive the arm away from the molded articles to transfer the molded articles from the takeout apparatus to the intermediate conveyor.

5. The system of claim 1 wherein said at least one fluid outlet includes an elongate fluid outlet through which fluid is directed toward said molded articles, the fluid outlet being substantially continuous along at least a portion of said cooling station so that a substantially continuous stream of fluid is directed toward said molded articles.

6. The system of claim 5 which includes at least two plates that are spaced apart to define the fluid outlet between them.

7. The system of claim 6 wherein at least one of said plates is movable relative to another plate to permit adjustment of the fluid outlet.

8. The system of claim 6 wherein the position of each of said at least two plates is adjustable so that a location of the fluid outlet relative to the molded articles can be adjusted.

9. The system of claim 7 wherein said at least one of said plates is movable to permit a direction of a stream of coolant fluid discharged from the fluid outlet to be changed relative to the molded articles.

10. The system of claim 6 wherein the fluid discharged from the fluid outlet is air.

11. The system of claim 10 wherein the air is chilled relative to ambient and exits the fluid outlet at between 30 to 80 degrees F.

12. The system of claim 10 wherein the air is pressurized.

13. The system of claim 11 wherein the air is pressurized.

14. The system of claim 5 wherein said fluid outlet is defined by a linear slot between two adjacent plates.

15. The system of claim 14 wherein said linear slot is continuous along a length of said plates.

16. The system of claim 1 wherein said cooling conveyor includes at least one pair of spaced apart belts adapted to frictionally engage and carry the molded plastic articles from the infeed section of the cooling conveyor to the outfeed section of the cooling conveyor.

17. A molded article cooling system comprising:
an in-line transfer mechanism that receives a continuous stream of soft molded articles and conveys the articles for consecutive travel along a path from an infeed section to an outfeed section without damage;
a cooling mechanism extending along at least a portion of the path for directing a substantially continuous stream of cooling fluid toward the plurality of molded articles as they travel along the path to cool the articles without undesired crystallization or haze;
wherein the transfer mechanism includes a take out apparatus traversing a path complimentary to a path of a rotating molding machine from which the take out apparatus receives the molded articles, and a conveyor for receiving the molded articles from the take out apparatus and for conveying the articles past the cooling mechanism;
wherein the takeout apparatus has a plurality of arms adapted to receive molded articles from the molding machine and to convey molded articles from the molding machine, the arms being driven in an endless path to transfer molded articles from the molding machine and wherein the system further comprises:
an intermediate conveyor as part of the conveyor for receiving molded articles from the takeout apparatus having an infeed section adjacent to at least a portion of the takeout apparatus to receive molded articles from the takeout apparatus and convey molded articles away from the takeout apparatus and an outfeed section from which molded articles leave the intermediate conveyor; a cooling station as part of the cooling mechanism through which the molded articles pass and including at least one fluid outlet through which fluid is directed toward the molded articles to cool them;
a cooling conveyor as the other part of the conveyor for conveying the articles past the cooling mechanism having an infeed section adjacent to the outfeed section of the intermediate conveyor to receive molded articles from the intermediate conveyor and an outfeed section from which molded articles are removed from the cooling station; and
wherein the cooling conveyor advances molded articles at a slower rate than does the intermediate conveyor to reduce the spacing between adjacent molded articles and increase the time that the molded articles are in the cooling station.

18. The system of claim 17 wherein the molding machine includes a plurality of radially aligned pairs of mold tooling and produces two radially aligned molded articles for each cycle of each pair of radially aligned mold tooling, each arm of the takeout apparatus includes two receptacles with each receptacle adapted to receive one of the two radially aligned molded articles, the intermediate conveyor including two conveyor paths with each conveyor path adapted to transfer one of the two radially aligned molded articles, and the cooling conveyor including two conveyor paths with each conveyor path adapted to transfer one of the two radially aligned molded articles.

19. A molded article cooling system comprising:
an in-line transfer mechanism that receives a continuous stream of soft molded articles and conveys the articles for consecutive travel along a path from an infeed section to an outfeed section without damage;
a cooling mechanism extending along at least a portion of the path for directing a substantially continuous stream of cooling fluid toward the plurality of molded articles as they travel along the path to cool the articles without undesired crystallization or haze;
wherein the transfer mechanism includes a take out apparatus traversing a path complimentary to a path of a rotating molding machine from which the take out apparatus receives the molded articles, and a conveyor for receiving the molded articles from the take out apparatus and for conveying the articles past the cooling mechanism;

wherein the takeout apparatus has a plurality of arms adapted to receive molded articles from the molding machine and to convey molded articles from the molding machine, the arms being driven in an endless path to transfer molded articles from the molding machine and wherein the system further comprises:

an intermediate conveyor as part of the conveyor for receiving molded articles from the takeout apparatus having an infeed section adjacent to at least a portion of the takeout apparatus to receive molded articles from the takeout apparatus and convey molded articles away from the takeout apparatus and an outfeed section from which molded articles leave the intermediate conveyor; a cooling station as part of the cooling mechanism through which the molded articles pass and including at least one fluid outlet through which fluid is directed toward the molded articles to cool them;

a cooling conveyor as the other part of the conveyor for conveying the articles past the cooling mechanism having an infeed section adjacent to the outfeed section of the intermediate conveyor to receive molded articles from the intermediate conveyor and an outfeed section from which molded articles are removed from the cooling station; and wherein the intermediate conveyor includes a perforated belt communicated with a vacuum source and adapted to engage an upper end of the molded articles to suspend the molded articles from the perforated belt under the vacuum force.

20. The system of claim 19 which also includes a cam associated with the takeout apparatus and wherein each arm of the takeout apparatus includes a follower responsive to a contour of the cam to bring at least one molded articles carried by the arm into engagement with the perforated belt, and thereafter to drive the arm away from the molded articles to transfer the molded articles from the takeout apparatus to the intermediate conveyor.

21. The system of claim 19 wherein said at least one fluid outlet includes an elongate fluid outlet through which fluid is directed toward said molded articles, the fluid outlet being substantially continuous along at least a portion of said cooling station so that a substantially continuous stream of fluid is directed toward said molded articles.

22. The system of claim 21 which includes at least two plates that are spaced apart to define the fluid outlet between them.

23. The system of claim 22 wherein at least one of said plates is movable relative to another plate to permit adjustment of the fluid outlet.

24. The system of claim 22 wherein the position of each of said at least two plates is adjustable so that the location of the fluid outlet relative to the molded articles can be adjusted.

25. The system of claim 23 wherein said at least one of said plates is movable to permit the direction of the stream of fluid relative to the molded articles to be changed.

26. The system of claim 22 wherein the fluid discharged from the fluid outlet is air.

27. The system of claim 26 wherein the air is chilled relative to ambient and exits the fluid outlet at between 30 to 80 degrees F.

28. The system of claim 26 wherein the air is pressurized.

29. The system of claim 21 wherein said fluid outlet is defined by a linear slot between two adjacent plates.

30. The system of claim 29 wherein said linear slot is continuous along the length of said plates.

31. The system of claim 17 wherein said cooling conveyor includes at least one pair of spaced apart belts adapted to frictionally engage and carry the molded plastic articles from the infeed section of the cooling conveyor to the outfeed section of the cooling conveyor.

* * * * *